United States Patent
Thubert

(10) Patent No.: US 8,102,775 B2
(45) Date of Patent: Jan. 24, 2012

(54) JOINING TREE-BASED NETWORKS INTO AN AUTONOMOUS SYSTEM USING PEER CONNECTIONS BETWEEN THE TREE-BASED NETWORKS

(75) Inventor: Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 1094 days.

(21) Appl. No.: 11/716,586

(22) Filed: Mar. 12, 2007

(65) Prior Publication Data

US 2008/0228940 A1  Sep. 18, 2008

(51) Int. Cl.
*H04L 12/26* (2006.01)
*G06F 11/00* (2006.01)
*G08C 15/00* (2006.01)

(52) U.S. Cl. ........................ 370/238; 370/351
(58) Field of Classification Search .................. 370/255, 370/256, 238, 390, 408; 709/238
See application file for complete search history.

(56) References Cited

U.S. PATENT DOCUMENTS

| | | | |
|---|---|---|---|
| 6,538,416 B1 * | 3/2003 | Hahne et al. ................. | 370/431 |
| 6,765,881 B1 * | 7/2004 | Rajakarunanayake ........ | 370/256 |
| 7,366,111 B2 * | 4/2008 | Thubert et al. ............... | 370/254 |
| 2003/0174653 A1 * | 9/2003 | Basu et al. .................... | 370/238 |
| 2004/0032852 A1 * | 2/2004 | Thubert et al. | |
| 2004/0081152 A1 * | 4/2004 | Thubert et al. ............... | 370/392 |
| 2005/0265259 A1 * | 12/2005 | Thubert et al. ............... | 370/255 |
| 2006/0007865 A1 * | 1/2006 | White et al. | |
| 2006/0088031 A1 * | 4/2006 | Nalawade .................... | 370/390 |
| 2006/0227724 A1 * | 10/2006 | Thubert et al. ............... | 370/254 |
| 2006/0291404 A1 | 12/2006 | Thubert et al. | |
| 2006/0291485 A1 | 12/2006 | Thubert et al. | |
| 2007/0086358 A1 | 4/2007 | Thubert et al. | |
| 2007/0091811 A1 | 4/2007 | Thubert et al. | |
| 2007/0153707 A1 | 7/2007 | Thubert et al. | |
| 2007/0153764 A1 | 7/2007 | Thubert et al. | |
| 2007/0230410 A1 | 10/2007 | Thubert et al. | |

FOREIGN PATENT DOCUMENTS

EP  1 324 532 A2  7/2003

OTHER PUBLICATIONS

U.S. Appl. No. 11/537,298, filed Sep. 29, 2006, Ribiere.*

(Continued)

*Primary Examiner* — Derrick Ferris
*Assistant Examiner* — Maharishi Khirodhar
(74) *Attorney, Agent, or Firm* — Leon R. Turkevich

(57) ABSTRACT

In one embodiment, a first router attaches to an attachment router based on detecting a first router advertisement message specifying an attachment prefix and a first tree information option. The first tree information option includes a first IP host address of a first clusterhead having established a first tree topology. The first router receives a second advertisement from a second router specifying a second address prefix, distinct from the attachment prefix and the first address prefix of the first router, and a second tree information option specifying a second IP host address of a second clusterhead having established a second distinct tree topology. If the first and second routers are at equal depths relative to the respective first and second clusterheads, routing information is shared, including first address prefix reachable via the first router, and a host route for reaching the first IP host address via the first router.

24 Claims, 9 Drawing Sheets

OTHER PUBLICATIONS

"Border Gateway Protocol", *Internetworking Technologies Handbook*, Chapter 39, pp. 39-1 to 39-10 (10 pages total) (Date Unknown).

Baker et al, "Problem Statement for OSPF Extensions for Mobile Ad Hoc Routing", <draft-baker-manet-ospf-problem-statement-00>, Mobile Ad Hoc and OSPF Working Groups, Sep. 23, 2003, pp. 1-20.

Baker et al., "An outsider's view of MANET", <draft-baker-manet-review-01>, Network Working Group, Mar. 17, 2002, pp. 1-39.

Chandra, "Extensions to OSPF to Support Mobile Ad Hoc Networking", <draft-chandra-ospf-manet-ext-02>, OSPF Working Group, Oct. 21, 2004, pp. 1-33.

Clausen et al, "DB Exchange for OSPFv2 Wireless Interface Type", <draft-clausen-manet-ospf-dbx-00.txt>, IETF MANET Working Group, Feb. 2004, pp. 1-24.

Ernst et al, "Network Mobility Support Terminology", <draft-ernst-mobility-terminology-00.txt>, IETF Working Group, Feb. 2002, pp. 1-14.

Perkins et al., "Ad hoc On-Demand Vector (AODV) Routing", <draft-ietf-manet-aodv-13.txt>, Mobile Ad Hoc Networking Working Group, Feb. 17, 2003, pp. i-ii and 1-35 (37 pages total).

Johnson et al, The Dynamic Source Routing Protocol:, <draft-ietf-manet-dsr-09.txt>, IETF MANET Working Group, Apr. 15, 2003, pp. i-v and 1-111 (116 pages total).

Garcia-Luna-Aceves et al., "Source Tree Adaptive Routing (STAR) Protocol", <draft-ietf-manet-star-00.txt>, IETF MANET Working Group, Oct. 22, 1999, pp. 1-26.

Ogier, "MANET Extension of OSPF using CDS Flooding", OSPF and Mobile Ad Hoc Networks Working Groups, <draft-ogier-manet-ospf-extension-03.txt>, Feb. 21, 2005, pp. 1-36.

Pillay-Esnault, "OSPF Refresh and Flooding Reduction in StableTopologies", <draft-pillay-esnault-ospf-flooding-07.txt>, Network Working Group, Jun. 2003, pp. 1-5.

Spagnolo et al, "Design Considerations for a Wireless OSPF Interface", >draft-spagnolo-manet-ospf-design>, Apr. 2004, pp. 1-32.

Ahrenholz et al., "OSPFv2 Wireless Interface Type", <draft-spagnolo-manet-ospf-wireless-interface-01>, Mobile Ad Hoc and OSPF Working Groups, May 12, 2004, pp. 1-28.

Moy, "OSPF Version 2", Network Working Group, Request for Comments: 2328, Apr. 1998, pp. 1-244.

Narten et al., "Neighbor Discovery for IP Version 6 (IPv6)", Network Working Group, Request for Comments: 2461, Dec. 1998, pp. 1-93.

Coltun et al., "OSPF for IPv6", Network Working Group, Request for Comments: 2740, Dec. 1999, pp. 1-80.

Bates et al.,"Multiprotocol Extensions for BGP-4", Network Working Group, Request for Comments: 2858, Jun. 2000, pp. 1-11.

Clausen et al., "Optimized Link State Routing Protocol (OLSR)", Network Working Group, Request for Comments: 3626, Oct. 2003, pp. 1-75.

U.S. Appl. No. 11/984,049, filed Nov. 13, 2007 (Thubert et al.).

* cited by examiner

A31 Routing Table, 54

| Dest. | Path | Cost | Seq. |
|---|---|---|---|
| A21::/64 | DEFAULT | | |
| A41::/64 | via A31::A41 | Don't Care (DC) | 6 ←218 |
| B1::F000 | via B31::1 | Depth=0 | 6 ←220a |
| B1::F000 | via A31::A41 | Depth=1 | 7 ←220b |
| B31::/64 | via B31::1 | Depth=0 | 6 |
| B41::/64 | via B31::1 | DC | 40 |

| | A1 Routing Table, 54 | | |
|---|---|---|---|
| Dest. | Path | Cost | Seq. |
| 18c → A21::/64 | via A1::A21 | Don't Care (DC) | 25 |
| 18b → A22::/64 | via A1::A22 | DC | 40 |
| 18h → A31::/64 | via A1::A21 | DC | 16 |
| 18g → A32::/64 | via A1::A21 | DC | 5 |
| 18d → A33::/64 | via A1::A22 | DC | 30 |
| 18e → A34::/64 | via A1::A22 | DC | 5 |
| 18k → A41::/64 | via A1::A21 | DC | 6 |
| 18i → A44::/64 | via A1::A22 | DC | 6 |
| 18j → A45::/64 | via A1::A22 | DC | 10 |
| 212 → B1::F000 | via A1::A21 | Depth=2 | 6 ← 220c |
| 212 → B1::F000 | via A1::A22 | Depth=3 | 1 ← 220d |
| B1::/64 | via B1::F0000 | DC | DC |
| B21::/64 | via B1::F0000 | DC | DC |
| B22::/64 | via B1::F0000 | DC | DC |
| B31::/64 | via B1::F0000 | DC | DC |
| B32::/64 | via B1::F0000 | DC | DC |
| B33::/64 | via B1::F0000 | DC | DC |
| B34::/64 | via B1::F0000 | DC | DC |
| B21::/64 | via B1::F0000 | DC | DC |
| B41::/64 | via B1::F0000 | DC | DC |
| B42::/64 | via B1::F0000 | DC | DC |
| B43::/64 | via B1::F0000 | DC | DC |
| 206 → C::/48 | via C::1 | 1 hop | DC |

JOINING TREE-BASED NETWORKS INTO AN AUTONOMOUS SYSTEM USING PEER CONNECTIONS BETWEEN THE TREE-BASED NETWORKS

TECHNICAL FIELD

The present disclosure generally relates to Internet Protocol (IP) based routing protocols that establish a tree topology.

BACKGROUND

U.S. Patent Publication No. 2006/0227724, published Oct. 12, 2006, describes a tree-based network topology with a single clusterhead in an ad hoc network establish connectivity based on each attached mobile router sending a neighbor advertisement message to an attachment mobile router via a corresponding egress interface. Any neighbor advertisement message received by a mobile router is used to identify specified network prefixes that are reachable via the source of the neighbor advertisement message. Each attached mobile router outputs to its attachment router another neighbor advertisement message that specifies the network prefix used by the mobile router, and the specified network prefixes from its attached mobile routers. The mobile router also identifies peer mobile routers having the same depth, and selectively shares limited routing information with the peer routers, enabling the mobile router to bypass the clusterhead and reach other prefixes via the peer routers without burdening the single clusterhead.

BRIEF DESCRIPTION OF THE DRAWINGS

Reference is made to the attached drawings, wherein elements having the same reference numeral designations represent like elements throughout and wherein:

FIGS. 6A and 6B illustrate an example routing table of a subordinate router within a subtree and an example routing table of the clusterhead, according to an example embodiment.

DESCRIPTION OF EXAMPLE EMBODIMENTS

Overview

Figure 1:
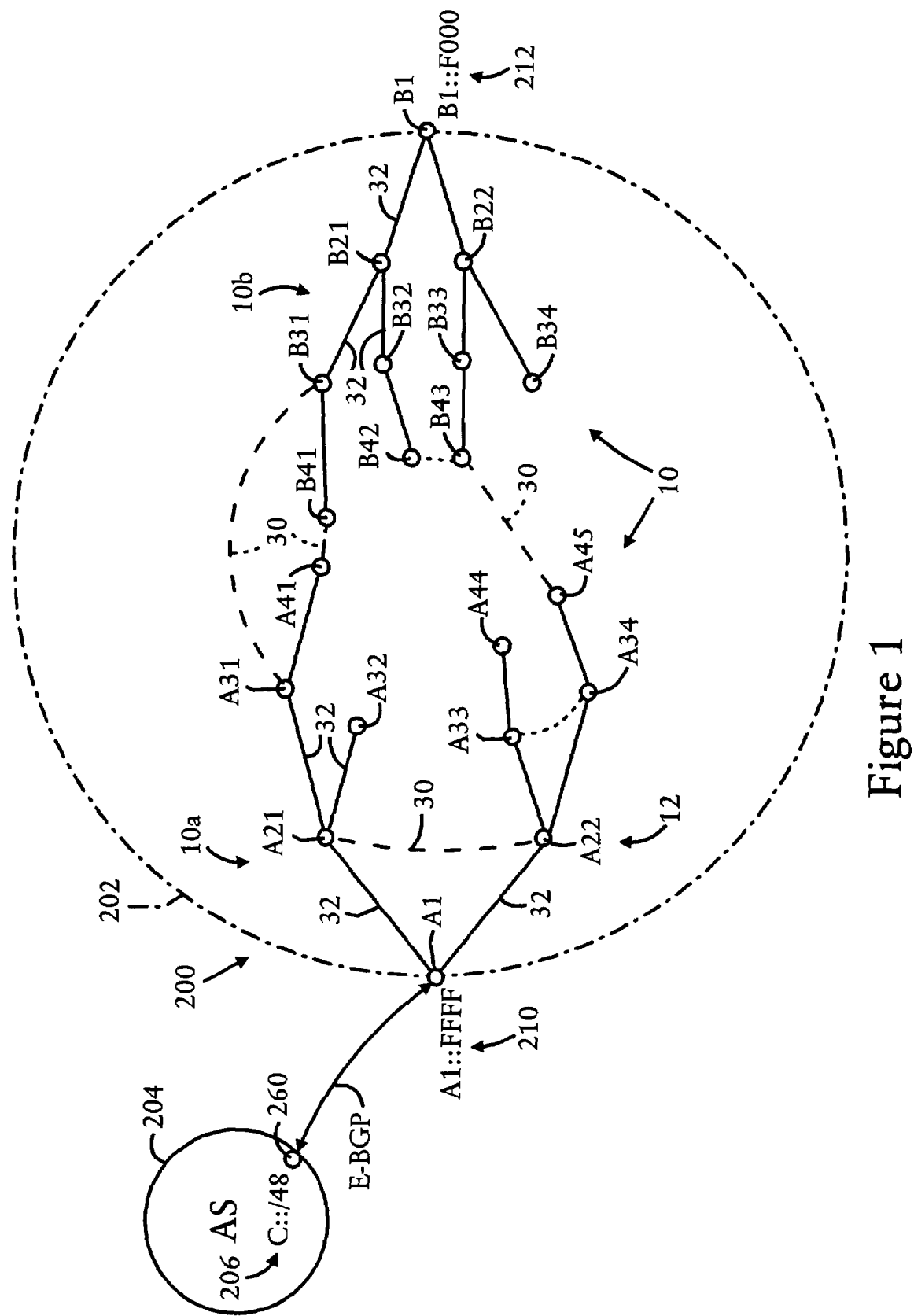
FIG. 1 illustrates an example Autonomous System having border routers serving as clusterheads for respective tree-based networks within the autonomous system, according to an example embodiment.

In one embodiment, a method comprises attaching by a first router to an attachment router based on detecting a first router advertisement message from the attachment router. The first router advertisement message specifies an attachment prefix owned by the attachment router and a first tree information option, the attachment prefix distinct from a first address prefix owned by the first router. The first tree information option specifies a depth of the attachment router within a first tree topology and a first IP host address of a first clusterhead having established the first tree topology. The attaching includes attaching to the first tree topology based on selecting a default attachment address within the attachment prefix owned by the attachment router, and identifying the depth of the first router relative to the first clusterhead based on the incrementing the depth specified for the attachment router. The method also includes receiving, by the first router, a second advertisement from a second router and specifying a second address prefix and a second tree information option, the second address prefix distinct from the attachment prefix and the first address prefix. The second tree information option specifies a second IP host address of a second clusterhead distinct from the first clusterhead and having established a second tree topology distinct from the first tree topology, the second tree information option further specifying the corresponding depth of the second router relative to the second clusterhead. The first router selectively shares routing information with the second router based on the first router determining that the corresponding depth of the first router relative to the first clusterhead equals the corresponding depth of the second router relative to the second clusterhead. The routing information includes specifying that the first address prefix is reachable via the first router, the routing information further including a host route for reaching the first IP host address via the first router.

In another embodiment, a method comprises outputting, by a router, a router advertisement message specifying an attachment prefix and a tree information option, the attachment prefix owned by the router and the tree information option identifying the router as a first clusterhead of a first tree topology based on the tree information option having a depth field specifying a zero depth and a tree identifier field specifying a first IP host address of the router. The method further includes receiving, by the router, neighbor advertisement messages from attached routers having attached to the router using respective attachment addresses within an address realm of the attachment prefix, each neighbor advertisement message specifying reachability via the corresponding attachment address of at least one address prefix that is distinct from the attachment prefix and distinct from other address prefixes specified in the neighbor advertisement messages from any other attached router. The method further includes detecting, by the router in at least one of the neighbor advertisement messages, at least a first host route for reaching a second IP host address of a second router via a corresponding at least one of the attachment addresses, the second IP host address not within the address realm of the attachment prefix or any of the address prefixes specified in the neighbor advertisement messages. The method further includes storing, by the router in a routing table in the router, the address prefixes reachable via the attachment addresses and the first host route based on the received neighbor advertisement messages, creating a communication path with the second router at the second IP host address based on the first host route, exchanging routing information by the router with the second router via the communication path, the routing information specifying the address prefixes specified in the neighbor advertisement messages, and the attachment prefix owned by the router, are reachable via the first IP host address of the router.

DETAILED DESCRIPTION

Particular embodiments extend the capabilities of the routers described in the above-identified U.S. Patent Publication No. U.S. 2006/0227724 A1, published Oct. 12, 2006, by enabling routers having established a first tree topology relative to a first clusterhead to establish peer connections not only with peer routers under the same tree topology under the first clusterhead, but also with peer routers of a second distinct tree topology established under a second distinct clusterhead. Hence, peer routers belonging to distinct tree topologies can share localized routing information via a local physical network link (e.g., wired or wireless), enabling the peer routers to establish a connection between the first and second distinct tree topologies. Each peer router shares routing information that not only includes address prefixes of subordinate routers attached within a subtree of the peer routers, but also includes a host route for reaching the corresponding clusterhead via the corresponding peer router. Further, the peer routers that belong to the distinct tree topologies can share the routing information according to an interior border gateway routing protocol (I-BGP), for example Open Shortest Path First (OSPF).

Hence, a router attached within the first tree topology under the first clusterhead can receive, from its peer router attached within the second tree topology under the second clusterhead, the host route for reaching the second clusterhead. The router attached within the first tree topology can forward the host route for reaching the second clusterhead in a neighbor advertisement message toward the first clusterhead via its own first tree topology. Consequently, the neighbor advertisement messages received by the first clusterhead from the routers attached within the first tree topology not only include the address prefixes reachable via the default attachment addresses of the attached routers, but also can include a host route for reaching the second clusterhead of the second tree topology.

Since the first clusterhead of the first tree topology now has a host route for reaching the second clusterhead of the second tree topology, the first clusterhead can establish a communication path (e.g., an IP based network tunnel) to the second clusterhead in order to share routing information, for example according to an interior border gateway routing protocol (I-BGP) such as OSPF. Hence, the tunnel between the first clusterhead and the second clusterhead enable the first and second clusterheads to establish a backbone area (identified, for example, as Backbone Area "0" in OSPF) of an Autonomous System containing the first tree topology and the second tree topology. Hence, each clusterhead also serves as a border router of an autonomous system that includes the first tree topology and the second tree topology.

Consequently, particular embodiments enable a scalable deployment of networks having established a tree topology, for example mobile routers having established a mobile ad hoc network having a tree topology as described in the U.S. Patent Publication No. U.S. 2006/0227724 A1, into a scalable autonomous system that can utilize an exterior border gateway routing protocol (E-BGP) for sharing routing information with other autonomous systems in a wide area network, such as the Internet, and which can establish distinct areas within the autonomous system based on sharing of routing information between peer routers.

FIG. 1 illustrates an example of autonomous system 200 formed by routers 12 within the autonomous system 200 based on the routers 12 having established a tree topology relative to border routers "A1", "B1" that serve as clusterheads for the respective trees 10a and 10b. The tree topology 10a has a border router "A1" that serves as a "root" (i.e., clusterhead) for the tree topology 10a, and the tree topology 10b has a border router "B1" that serves as the clusterhead for the tree topology 10b; hence the tree topology 10b is "distinct" from the tree topology 10a because there is no overlap between the tree topologies 10a and 10b.

Figure 2:
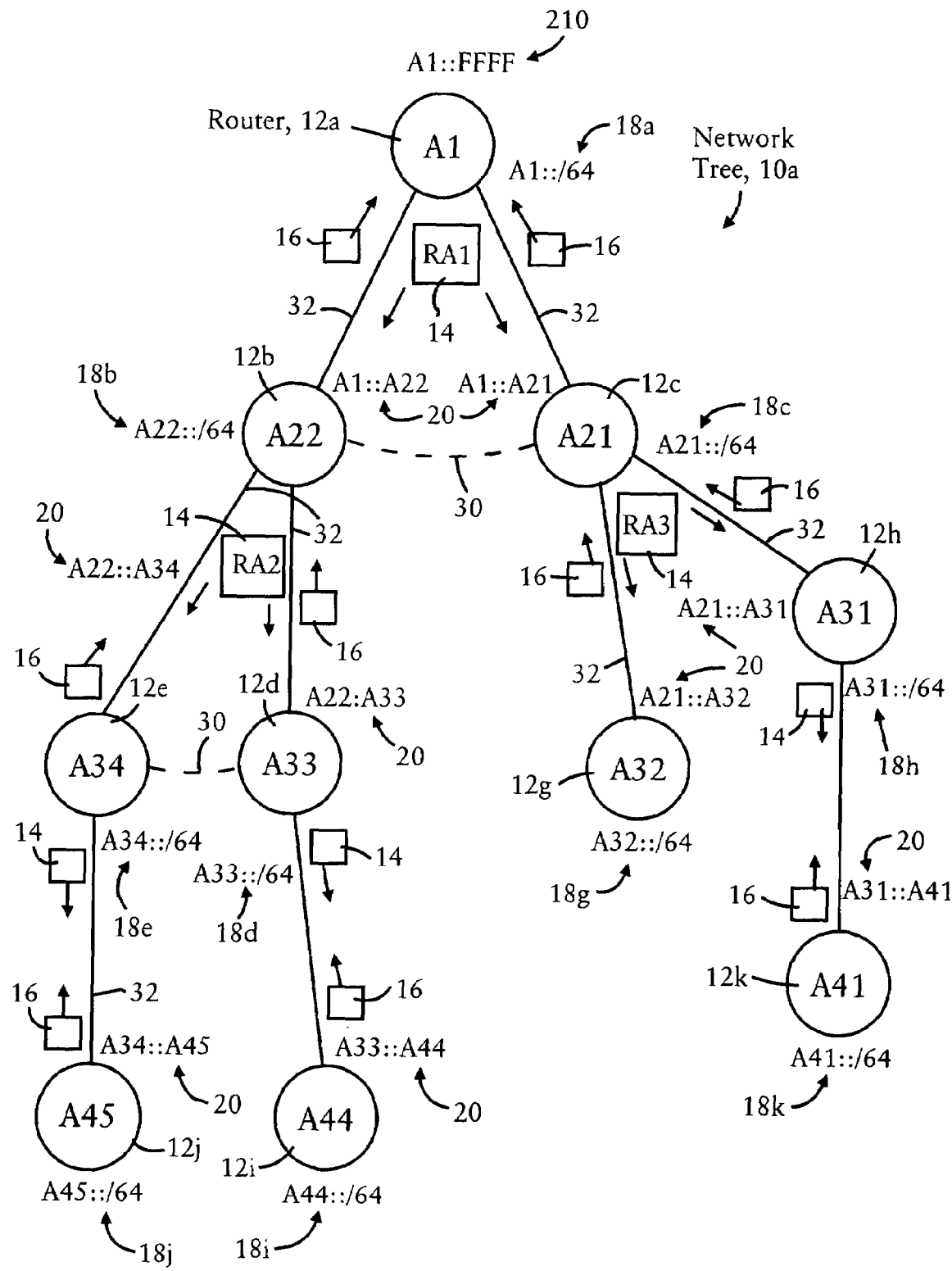
FIG. 2 illustrates an example tree-based ad hoc network from the system of FIG. 1 and having multiple routers connected to a clusterhead according to a tree-based topology, according to an example embodiment.

As illustrated in FIG. 1, each router 12 joins the nearest tree topology 10 in response to detecting the corresponding router advertisement messages from the border routers "A1" and "B1" 12 and propagated by attached routers (e.g., "A1", "A22", "B21", and "B22") to subordinate routers (e.g., "A31", "A32", "A33", "A34", "A41", "A44", "A45", "B31", "B32", "B33", "B34", "B41", "B42", and "B43") 12. Hence, each attached router or subordinate router (hereinafter referred to generically as attached router) connects to its attachment router via an attachment link 32 representing a physical (wired or wireless) link between an attached router (e.g., "A21") and its attachment router (e.g., "A1"). As illustrated in FIGS. 1 and 2, each attachment link 32 is illustrated by a solid line. Note that the clusterheads "A1" and "B1" also can be referred to as "attachment routers" because they provide attachment points for the attached routers (e.g., "A21", "A22", "B21", "B22"). Similarly, the routers "A21", "A22", "B21", "B22" also can be referred to as "attachment routers" because they serve as attachment points for the subordinate routers, including "A31", "A33", "B31", "B33", etc. Note, however, that the attached routers "A32", "A41", "A44", "A45" of the first tree topology 10a and the attached routers "B34", "B41", "B42", and "B43" of the second tree topology 10b have no attached routers, and therefore cannot be referred to as attachment routers, but can be referred to as subordinate routers, child routers, or leaf routers.

As illustrated in FIG. 1, all routers 12 having an address prefix beginning with the value "A" belong to the first tree topology 10a, and all routers 12 having an address prefix beginning with the value "B" belong to the second tree topology 10b for illustration sake only: it should be noted that each of the prefixes 18 of the routers 12 are illustrated as distinct, and therefore cannot be aggregated, in order to better illustrate the example features of using neighbor advertisement messages to propagate routing information toward the clusterheads.

As described in further detail below, example routers can establish peer connections 30 (illustrated by a dashed line in FIGS. 1 and 2) not only between peer routers within the same tree topology (e.g., between peer routers "A21" and "A22", "A33" and "A34", "B42" and "B43"), but also between peer routers in a distinct tree. Hence, the routers "A31" and "B31" establish a corresponding peer connection 30; the routers "A41" and "B41" establish a corresponding peer connection 30; and the routers "A45" and "B43" establish a corresponding peer connection 30. Each peer connection 30 is a physical link (e.g., wired or wireless) that provides connectivity between the peer routers. As described below, the peer routers share routing information via the peer connection according to a prescribed I-BGP protocol, including host route information for reaching the clusterheads "A1" and "B1" via their respective host IPv6 addresses "A1::FFFF" 210 and "B1::F000" 212. Hence, each of the routers "A31", "A41", and "A45" propagate the host route information for reaching the clusterhead "B1" toward their clusterhead "A1" via the corresponding tree topology 10a; similarly, each of the routers "B31", "B41", and "B43" propagate the host route information for reaching the clusterhead "A1" toward their clusterhead "B1" via the corresponding tree topology 10b.

Upon receiving the host route information, the clusterheads "A1" and "B1" can establish at least one communication path (e.g., virtual tunnel) 202, illustrated in FIG. 1 by the dotted and dashed line, for exchange of routing information between the clusterheads "A1" and "B1" according to a prescribed protocol such as I-BGP. Use of an interior border gateway protocol is particularly beneficial because the clusterheads "A1" and "B1" do not need to store link state information for every available link among the routers 12; rather, use of the tree topology minimizes the requirements distributing routing information that normally is required under other protocols such as link state protocols or distance vector protocols.

Hence, the clusterheads "A1" and "B1" can form a backbone area (e.g., OSPF Area "0") via the virtual tunnel 202, and the attached peer routers (e.g., "A31", "A41", "A45", etc.) can form their own distinct nonzero areas (e.g., OSPF Area "1", "2", etc.) using their respective peer connections 30, resulting in a conjoined network 200 based on the joining of the trees 10a and 10b via the peer connections and exchange of routing information via the backbone area and the nonzero areas. Consequently, the formation of the backbone area by the clusterheads "A1" and "B2" enable the clusterheads "A1" and "B2" to serve as border routers for the autonomous system 200 in order to the exchange routing information with a border router 260 of another autonomous system (AS) 204 using a routing protocol such as Exterior Border Gateway Protocol (E-BGP).

FIG. 2 is a diagram illustrating an example tree-based topology 10a, for example a mobile ad hoc network, formed by the routers 12, illustrated for example as mobile routers that can operate in a mobile ad hoc network (MANET). The mobile routers 12 and any mobile hosts (not shown) initially can establish link layer connectivity between each other based on an autonomous mesh of link layer connections, for example wireless IEEE 802.11 connections. Note, however, that certain links also can be wired links, for example IEEE 802.3 Gigabit links, or higher. Mere link layer connectivity, however, does not provide any optimization of routing protocols between the mobile routers. Hence, the mobile routers 12 establish a mobile ad hoc network 10 at the network (e.g., IP) layer based on each mobile router 12 logically assigning source-destination network layer (e.g., IP) address pairs as one of an ingress link, an egress link, or a peer link. In other words, each mobile router 12 will identify whether a IP datagram (also referred to as an IP packet or simply a "data packet" or "packet") received on a wireless link should be associated as being logically received on an ingress network link, an egress network link, or a peer network link based on the link layer and/or IP source address of the packet and the routing protocols described herein.

Consequently, a single wireless IEEE 802.11 link may be used transport packets among different mobile routers 12, where each mobile router 12 determines whether a packet received on the wireless link should be logically assigned as having been received from an ingress link, an egress link, or a peer link.

Each attachment router (e.g., a clusterhead 12a) is configured for outputting a router advertisement message 14 that specifies a prescribed address prefix 18 used by the attachment router, and each attached mobile router (e.g., 12b, 12c) is configured for attaching to one of the attachment routers in response to received advertisement messages by selecting a default attachment address 20, and in compliance with a protocol requiring establishment of a tree topology having a single clusterhead 12a. Note that the IPv6 address prefix (e.g., "A1::/64") 18 used by a router (e.g., 12a) refers to the address prefix used by the mobile router 18 in creating and maintaining an addressable subnet for routing of data packets to nodes connected to ingress ports of the mobile router 18; in other words, a mobile router 18 includes address table entries for routing packets within the subnet specified by the address prefix used by the mobile router 18.

The example tree topology 10a is relied upon to minimize the amount of routing information needed to be transferred among routers 12. In particular, a tree topology having a single clusterhead 12a inherently has no loops. Since the tree topology 10 inherently has no loops, attached mobile routers can be configured to provide no more than the minimum routing information necessary for an attached mobile router to identify network address prefixes that are reachable via an attached mobile node.

Figure 4:
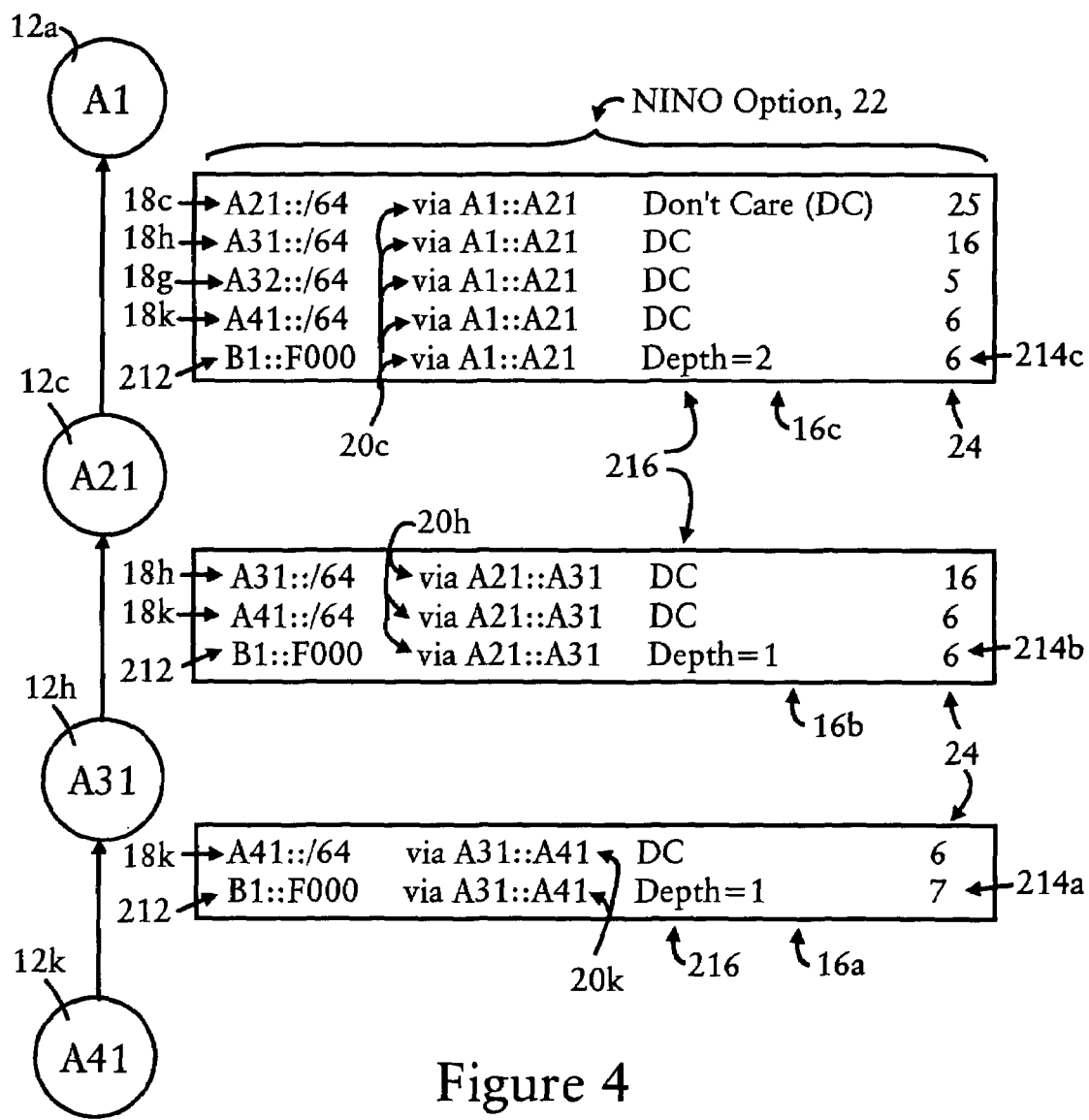
FIG. 4 illustrates an example of neighbor advertisement messages having accumulated network prefixes and host routes propagated from a subtree toward the clusterhead, according to an example embodiment.

Hence, attached mobile routers (e.g., 12b, 12c) identify themselves to an attachment mobile router (e.g., 12a) by sending neighbor advertisement messages 16 that specify a network-in-node option, namely that a network node has at least one network address prefix. As illustrated in FIG. 4, the network-in-node option 22 specifies to the attachment mobile router (e.g., 12a) merely that a given network prefix 18 (e.g., A21::/64 of mobile router "A21" 12c) is reachable via a default attachment address 20 (e.g., A1::A21) within the address space of the address prefix 18 of the attachment router (i.e., the attachment prefix).

Hence, a neighbor advertisement message 16 from the attached mobile router 12c can be detected by the attachment mobile router 12a to specify merely that the network prefix "A21::/64" 18 is reachable via the address "A1::A21" 20 which is within the address realm (i.e., address space) of the attachment prefix "A1::/64" 18 used by the attachment mobile router 12a. Note that no further routing information (e.g., hop count, home address of a node, topology information, source routing information, link state information, etc.) needs to be sent to the attachment router 12a, since the attachment mobile router only needs to be aware of address prefixes of attached mobile routers. As described in detail below, the mobile routers 12 are configured for routing any packet specifying an unknown destination to its default attachment router; hence, the packet is routed toward the clusterhead 12a until a mobile router can identify the destination address relative to an identified network prefix 18.

Hence, the disclosed embodiment provides an efficient proactive routing protocol that minimizes the necessity of bandwidth and processing requirements to accommodate rapid topology changes by providing rapid convergence.

Each of the attached mobile routers (e.g., 12b, 12c, 12d, 12e, 12g, etc.) can be configured for selectively sharing routing information with peer mobile routers, i.e., mobile routers that are at the same depth within the either the tree 10a or another tree 10b, illustrated in FIG. 1. In particular, each mobile router 12 is configured for identifying peer mobile routers that are at the same depth relative to the corresponding clusterhead (e.g., "A1" or "B1"), and utilizing peer links 30 to selectively share routing information, and send packets between peer mobile routers, enabling the clusterheads "A1" and "B1" to be bypassed. Unlike the attachment links 32 used to connect attached routers to attachment routers, however, the peer links 30 are not part of the tree topology 10, and therefore their existence and the peer routing information is not propagated up the tree toward the clusterhead; rather, the peer links 30 are considered an optimization of the tree 10, such that the peer routing information is shared only between the peer routers and, optionally, attached routers within the associated subtree. Further, the peer routing information is limited between peer routers in a manner that ensures that tree optimization is preserved.

Hence, a packet from the mobile router 12h destined for the mobile router 12i can be sent by the mobile router 12c to its peer mobile router 12b via the corresponding peer link 30, reducing the traffic encountered by the clusterhead 12a and reducing the distance traveled by one hop.

Peer links 30 also can be established between peer routers of distinct trees 10a and 10b, enabling the peer routers (e.g., "A31" and "B31" of FIG. 1) to establish their own routing area (e.g., OSPF Area "1") that includes the peer routers "A31", "B31" and the subordinate routers "A41", "B41" within the respective subtrees. Hence, any data traffic can be localized within the routing area containing the routers "A31", "B31", "A41", and "B41".

A description will first be provided of formation of the tree topology, followed by a description of the use of the peer links 30 for optimizing communication throughout the tree 10. Additional details regarding the formation of the tree topology, and propagation of neighbor advertisement messages (i.e., attached router messages) are found in the U.S. Patent Publication No. U.S. 2005/0265259 A1, published Jun. 1, 2004.

The example embodiment can dynamically assemble layer 2 clusters into a tree-based topology model 10 as illustrated in FIG. 2 using the attachment techniques described in U.S. Patent Application Publication US2004/0032852 A1, published Feb. 19, 2004.

According to the disclosed embodiment, the network can be organized into a tree-based topology cluster, where the clusterhead (i.e., a root of a tree) 12a is determined by having the highest relative preference metric visible to other mobile routers. Preference metric may be based on an explicit preference value, or based on a tree depth identifier indicating the relative position of the mobile router relative to the clusterhead; in other words, tree depth indicates the number of hops to the clusterhead. A mobile router associates with the router advertisement (RA) originator by storing the information in the RA message in its default router list, and selecting the source of the RA message as its attachment router.

As illustrated in FIG. 2, the mobile routers 12b and 12c, in response to detecting the unsolicited router advertisement message ("RA1") 14, add the RA1 message 14 to their internal default router list 55, described in detail below with respect to FIG. 5. The mobile routers 12b and 12c select the mobile router 12a as their attachment router based on a specified preference metric (e.g., preference value, mobile router 12a advertised as a clusterhead based on a zero depth, etc.).

For example, the mobile router 12b creates a default attachment address ("A1::A22") 20 on its egress interface that is within the address space of the address prefix "A1::/64" 18 advertised by the clusterhead 12a; the mobile router 12b also adds an entry in its routing table that specifies that the address prefix "A1::/64" is reachable via the default attachment address "A1::A22" 20. Similarly, the mobile router 12c creates a default attachment address ("A1::A21") 20 on its egress interface that is within the address space of the address prefix "A1::/64" 18 advertised by the clusterhead 12a; the mobile router 12c also adds an entry in its routing table that specifies that the address prefix "A1::/64" is reachable via the default attachment interface having been assigned the default attachment address "A1::A21" 20.

The mobile routers 12b and 12c begin outputting respective router advertisement messages "RA2" and "RA3" 14, advertising their respective address prefixes 18 ("A22::/64" and "A21::/64"), and the tree depth/preference based on the clusterhead 12a being the top level mobile router. As described above, any unknown address is sent by a mobile router to its default attachment address, hence, the router advertisement messages "RA2" and "RA3" 14 need not specify the address prefix "A1::/64" of the clusterhead, since all attached mobile routers (e.g., 12d, 12e, 12f, 12g, 12g) will forward unknown destinations by default to the mobile routers 12b or 12c.

As described below with respect to FIG. 3, however, the router advertisement message 14 output by the clusterhead 12a includes a tree information option 66 that includes a tree identifier field 68a and a depth field 68b. The tree identifier field 68a specifies the host IP address (e.g., "A1::FFFF") 210 of the clusterhead (e.g., "A1") 12a. Hence, each router receiving the router advertisement message stores the host IP address 210, enabling each router to establish a host route to the host IP address (e.g., "A1::FFFF") 210 of the clusterhead (e.g., "A1") 12a via the corresponding default attachment address.

The mobile routers 12d, 12e, having the respective network prefixes ("A33::/64" and "A34::/64") 18 attach to the mobile router 12b as their attachment router by selecting respective default attachment addresses 20 ("A22::A33", "A22::A34"). The mobile routers 12g, 12h, having the respective network prefixes 18 ("A32::/64" and "A31::/64") attach to the mobile router 12c as their attachment router by selecting respective default attachment addresses 20 ("A21::A32" and "A21::31").

Similarly, the mobile routers 12i, 12j, 12k having respective address prefixes "A44::/64", "A45::/64", and "A41::/64" 18 select respective default attachment addresses "A33::A44", "A34::A45", and "A31::A41" 20.

Assuming that no other information has been output into the network 10 other than the router advertisement messages 14, at this stage each attached router only knows its default route toward the clusterhead 12a. In other words, none of the mobile routers 12 have any information related to any attachment nodes away from the clusterhead. For example, if the mobile router 12i wanted to send a ping to the mobile router 12k at the destination address "A41::A41", the ping would be transferred up to the clusterhead 12a by the mobile routers 12d and 12b, which are configured to output unknown destinations on their respective default attachment addresses. However, since the mobile router 12a does not know about the reachability of the mobile router 12k serving the address prefix "A41::/64", the mobile router 12a would drop the ping unless was specifically addressed to a destination address within the address prefix "A1::/64" used by the clusterhead 12a. Also note that even though the mobile router 12a may know about the layer 2 (MAC) addresses of the mobile routers 12b and 12c, the mobile router 12a does not have information regarding the global IP addresses utilized by the mobile routers 12b and 12c; further, the mobile router 12a would not be able to locate the address prefixes used by the subordinate mobile routers 12d, 12e, 12g, 12h, 12i, 12j and 12k because they do not share a layer 2 link with the mobile router 12a.

At this stage proactive routing protocols typically would be used to exchange topology and reachability information between the routers, and to ensure no loops were formed. However, the disclosed embodiment emphasizes minimizing the use of routing protocols due to their substantial costs that increase convergence times.

As described below, internal communications within the cluster 10 can be minimized using the neighbor advertisement messages 16, eliminating the necessity for optimizing procedures such as the proactive Optimized Routing Algorithm (ORA) MANET protocol. In contrast to all the mobile routers 12 registering with the clusterhead 12a to provide the clusterhead 12a with the source route path to all the prefixes 18, the clusterhead 12a simply needs to know which attachment address (e.g., A1::A21 or A1::A22) 20 should be used to reach the identified prefix 18.

Hence, each attached mobile router 12 sends to its attachment router a neighbor advertisement message 16 specifying that the prescribed address prefix used by the mobile router 12, and any address prefixes stored internally from received neighbor advertisement messages received by the attached mobile router from other mobile routers, are reachable via the default attachment address used by the mobile router 12. As described below, the neighbor advertisement messages 16 also can specify a host route toward an identified IP address, for example the IP address of another clusterhead of a distinct tree topology.

FIG. 4 is a diagram illustrating successive neighbor advertisement messages 16a, 16b, and 16c output by the respective mobile routers 12k, 12h, and 12c based on having attached to an attachment router according to the tree topology 10 of FIG. 2, and based on the routers 12k and 12h having established peer connections 30 with peer routers of a distinct tree 10b. As described below, the mobile router 12k obtains a host route to the clusterhead "B1", identified by its IP address "B1::F000" 212, from its peer router "B41" 12 via its corresponding peer connection 30; hence, the router 12k creates a host route entry in its routing table specifying that the IP address "B1::F000" 212 is reachable via the advertised address of the peer router "B41" (e.g., "B41::1"). Since the router 12k now has a host route for reaching the clusterhead "B1" via the peer router "B41", the router 12k can specify in the neighbor advertisement message 16a the host route 214a that the IP address "B1::F000" 212 is reachable via the attachment address "A31::A41" 20k of the router 12k.

Hence, the mobile router 12k outputs the neighbor advertisement message 16a with a network-in-node option portion 22 specifying the address prefix ("A41::/64") 18k used by the mobile router 12k, and the host route 214a specifying that host IP address "B1::F000" 212 of the clusterhead "B1" is reachable via the default attachment address "A31::41" 20k selected by the mobile router 12k, at a cost 216 of "Depth=1" relative to its peer router "B41" of the other tree topology 10b. As will be described below, since each of the peer routers are at the same depth, the cost can be expressed as the relative cost to reach the second tree topology, since the actual cost between reaching clusterheads will be twice the relative cost plus one. As described above, the default attachment address "A31::A41" 20k is within the address space of the attachment prefix ("A31::/64") 18d used by the mobile router 12h serving as an attachment router for the mobile router 12k.

The neighbor advertisement message 16a also includes a sequence identifier 24 for the corresponding address prefix 18k and host route 212, described below.

The mobile router "A31" 12h, in response to receiving the neighbor advertisement message 16a, creates a tree table entry 218 in its internal routing table 54, illustrated in FIG. 6A, that specifies that the address prefix ("A41::/64") 18k is reachable via the attachment address ("A31::A41") 20k. In response to the host route 214a in the received neighbor advertisement message 16a, the mobile router 12h also creates a host route table entry 220b by incrementing the cost attribute 216 specified in the received neighbor advertisement message 16a and specifying that the host IPv6 address "B1::F000" 212 is reachable via the attachment address "A31::A41" 20k. Since the attachment address 20k is within the address space of the attachment prefix 18h used by the mobile router 12h, the mobile router 12h will know how to route any data packet to the attachment address 20k based on correlating the attachment address 20k to a prescribed ingress interface having a prescribed layer 2 (MAC) address. Although not shown, it is assumed the mobile router 12h also can create additional routing table entries for any other mobile router that attaches to the mobile router 12h and sends a neighbor advertisement message.

FIG. 6A illustrates the routing table 54 of the mobile router "A31" 12h, according to an example embodiment. The routing table 54 includes tree table entry 218 and the host route table entry 220b based on the received neighbor advertisement message 16a. The routing table 54 also includes peer table entries 222 and another host route table entry 220a based on exchanging routing information with the peer router "B31" via the corresponding peer link 30, illustrated in FIG. 1. A "tree table entry" 218 is a table entry that identifies a path to an address prefix within its subtree (i.e., from an attached router) within the same tree topology 10. A "host route entry" (or "host route table entry") 220 is a table entry that identifies a path to a host IPv6 address to a destination (e.g., the clusterhead of another tree topology) that is not in the same tree topology 10. A "peer table entry" 222 is a table entry of a remote address prefix 226 that are not within the same subtree of the router, which can be within the same tree topology (e.g., 10a) (e.g., if router "A31" formed a peer connection 30 with "A33" of FIG. 2, it would store a peer table entry that prefix "A44::/64" was reachable via an identified address for "A33"), or a different tree topology (e.g., 10b); in the case of a clusterhead (e.g., "A1" or "B1"), a "peer table entry" 222 is a table entry of a remote address prefix 226 in a remote tree topology (e.g., 10a) and that is reachable via the peer router (e.g., "B31") in another tree topology (e.g., 10b). As described previously, since the peer routers can share routing information according to I-BGP, the router "A31" can receive all remote prefixes 226 in the routing table of "B31", including reachability of the remote prefixes "B31::/64" 226 and "B41::/64" 226 via the peer router default address 224 for the router "B31", for example "B31::1".

Although not shown in FIG. 6A, the routing table 54 also can include additional information in each entry, for example a field that identifies the entry as a tree table entry 218, a host route table entry 220, or a peer table entry 222; alternately, the routing table 54 can be partitioned into separate, distinct subtables, where one subtable can store tree table entries 218, another subtable can store host route table entries 220, and another subtable can store peer table entries.

In response to creating any new entry (or deleting any entry) in its routing table 54, the mobile router 12h outputs a neighbor advertisement message 16b that specifies that its own address prefix "A31::/64" 18h, plus any prefix specified in a tree table entry 218 (e.g., 18k), and any host address 212 specified in a host route table entry 220a or 220b, are reachable via the default attachment address ("A21::A31") 20h of the mobile router 12h. As described below, the attached router (e.g., 12h) can choose the "best" host route path 214 for reaching a given destination host from among the stored entries (e.g., 220a, 220b), and specify only the best path in its neighbor advertisement message (e.g., 16b). Alternately, the attached router could specify multiple host routes having respective paths (e.g., via attachment address 20h or 20k) which enables the clusterhead "A1" to reach the other clusterhead "B1" via different tunnels distinct from the default paths, as desired. The "best" host route path 214 can be determined by the router based on available metrics, for example the lowest cost 216 in terms of "depth" relative to the peer router in the other tree topology.

Note that the neighbor advertisement message 16*b* does not include any of the remote prefixes 226 received from the peer router "B31". As described previously, prefixes received from a peer router according to a prescribed peer protocol, for example an I-BGP type protocol such as OSPF, are not supplied in the neighbor advertisement message 16*b* in order to minimize the size of the neighbor advertisement message 16*b*. Rather, the clusterhead "A1" can use the host route to reach the other clusterhead "B1", enabling the clusterheads "A1" and "B1" to share routing information as peers of a backbone area.

The mobile router 12*c* repeats the process of adding tree entries 218 specifying address prefixes reachable within the subtree, and any host route entries 220 upon updating the costs 216, to its internal routing table 54 in response to receiving the neighbor advertisement message 16*b*. The mobile router 12*c* also adds a tree entry 218 in response to receiving the neighbor advertisement message 16 from the mobile router 12*g* specifying that the address prefix "A32::/64" 18*g* is reachable via the default attachment addresses "A21::A32". In response to adding the entries in its routing table 54, the mobile router 12*c* outputs the neighbor advertisement message 16*c* specifying that its prescribed IPv6 network address prefix ("A21::/64") 18*c*, plus the address prefixes 18*g*, 18*h*, and 18*k*, are reachable via the default attachment address ("A1::A21") 20*c* of the mobile router 12*c*. The mobile router 12*c* also adds an updated host route entry 214*c*. Since the host route 214*b* specified in the received advertisement message 16*b* specifies reachability of the host IP address "B1::F000" 212 via the default attachment address "A21::A31" 20*h* within the address space of its address prefix "A21::/64" 18*c*, the router 12*c* can update the host route 214*b* with an updated host route 214*c* specifying that the host address "B1::F000" 212 is reachable via its own corresponding attachment address "A1::A21" 20*c* at a corresponding cost 216 of "Depth=2".

Each entry specified in the neighbor advertisement message 16*a*, 16*b* can have has its corresponding sequence identifier 24 propagated up to the next neighbor advertisement message 16*c*. Although not shown in FIG. 4, each neighbor advertisement message 16 can specify for each specified address prefix 18 a corresponding depth field 216 that enables the router receiving the neighbor advertisement message 16 to identify the relative depth, also referred to as cost (e.g., hop count) of reaching the corresponding address prefix 18.

As described previously, the neighbor advertisement message 16*c* does not include any of the address prefixes learned by the router "A21" 12*c* from its peer router "A22" 12*b* via the corresponding peer connection 30, illustrated in FIGS. 1 and 2.

Hence, in response to receiving the neighbor advertisement message 16*c* from the attached mobile router 12*c*, and a corresponding neighbor advertisement message 16 from the mobile router 12*b*, the router 12*a* can store the routing information from the received neighbor advertisement messages 16 from the attached mobile routers 12*b* and 12*c* in its routing table 54. As illustrated in FIG. 6B, the router 12*a* stores the tree entries 218 and the host route entries 220*c* and 220*d* based on the received neighbor advertisement messages 16 from the attached mobile routers 12*b* and 12*c*, enabling the clusterhead "A1" 12*a* to reach all of the address prefixes 18 in its tree topology 10*a*, and needs to choose simply whether to route a packet to the attachment address "A1::A22" or "A1::A21" within its prescribed subnet prefix "A1::/64".

The clusterhead "A1" also has multiple host route entries 220*c*, 220*d* for reaching the IPv6 host address "B1:F0000" of the second clusterhead "B1" of the second tree topology 10*b*, based on the neighbor advertisement messages 16 received from the attached routers 12*b* and 12*c*. Hence, the clusterhead "A1" 12*a* can "ping" the second clusterhead "B1", and begin exchanging peer routing information via the virtual tunnel 202 of FIG. 2, using one of the host routes 212. In particular, the clusterhead "A1" 12*a* builds a packet (i.e., an IP datagram) having a destination address field specifying the host address "B1::F000" 212 of the clusterhead "B1" as the destination address, and uses the host route entry 220*c* having the least cost path to output the packet onto the ingress interface providing a layer 2 (i.e., link layer) attachment connection 32 with the attached router 12*c*. The router "A21" 12*c*, recognizing that it has a path to the destination address "B1::F000" 212 (from the host route 214*b* specified in the neighbor advertisement message 16*b*) in its routing table for reaching the destination address "B1::F0000" 212, forwards the packet onto its ingress interface providing a link layer connection for the attached router 12*h* having the default attachment address "A21::A31" 20*h*.

In response to the router "A31" 12*h* detecting the packet on its egress interface, the router "A31" detects the least cost host route entry 220*a* in FIG. 6A for reaching the destination address "B1::F000" 212 via the next hop address "B31::1" 224 of the peer router "B31": the router "A31" 12*h* forward the packet on its link layer interface (e.g., peer port 43 in FIG. 5) that has a link layer peer connection 30 with the peer router "B31": the peer router "B31" in response to receiving the packet, determines that it has its own host route to its own clusterhead (identified by its IPv6 address "B1:F000" 212), and forwards the packet via its egress interface toward its clusterhead "B1" via the second tree topology 10*b*.

In response to the second clusterhead "B1" receiving the packet, the second clusterhead "B1" can identify that the source address "A1::FFFF" 210 specified in the packet is reachable via the default attachment address of its attached router "B21" (e.g., "B1::B21"), based on a similar propagation of neighbor advertisement messages 16 including at least one host router 214 by the routers 12 attached to the tree topology 10*b*. Since the second clusterhead "B1" has a host route to the host IPv6 address "A1::FFFF" 210 based on the received neighbor advertisement messages from its attached router "B21", the second clusterhead "B1" can respond to the packet from the first clusterhead "A1" using the reverse path, where the packet is output by the second clusterhead "B1" on its ingress interface providing link layer connectivity via an attachment link 32 with the attached router "B21".

Hence, the two clusterheads "A1" and "B1" can exchange routing information via the virtual tunnel 202 that is established based on the attachment links 32 between routers "A1", "A21", "A31", the peer link 30 between routers "A31" and "B31", and the attachment links 32 between routers "B31", "B21", and "B1". The clusterheads "A1" and "B1" can exchange the routing information according to a routing protocol such as I-BGP, enabling the clusterhead "A1" to populate its routing table 54 with entries 222 specifying that the remote prefixes 226 that are reachable via the host address "B1::F000" 212, illustrated in FIG. 6B. In addition, if the clusterhead "A1" has any additional entries 228 of a remote prefix 206 from another autonomous system 204 (obtained according to E-BGP) as illustrated in FIG. 1, the clusterhead "A1" can forward to the peer clusterhead "B1", according to I-BGP, the reachability information for reaching other autonomous systems.

Figure 5:
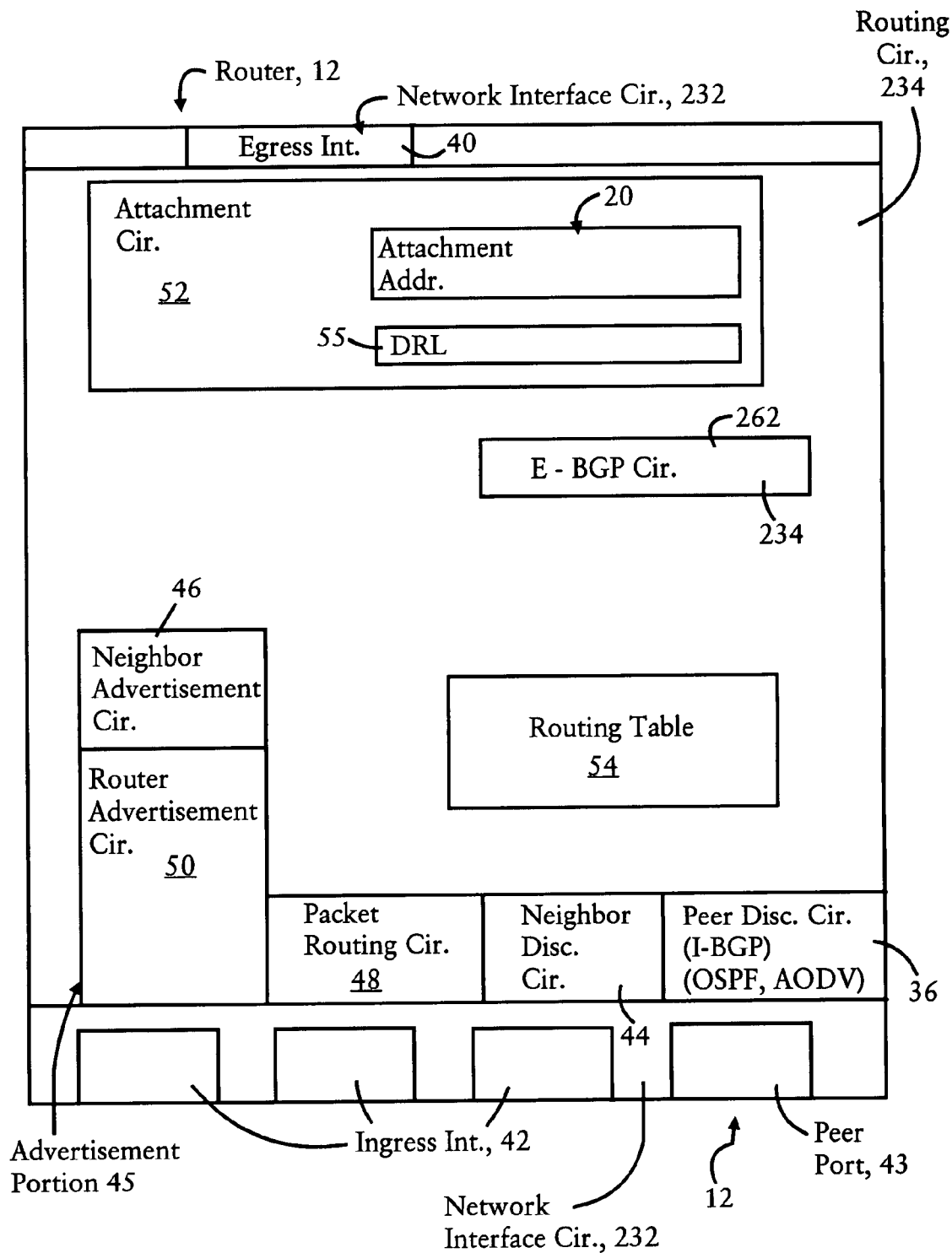
FIG. 5 illustrates an example router from the system of FIG. 1 according to an example embodiment.

FIG. 5 is a logical diagram illustrating one of the routers 12 of the autonomous system 200, according to an example embodiment. The disclosed router 12 can be any one of the routers in the autonomous system 200, except that certain features can be omitted if not needed: for example, if a given router is to be preconfigured to not ever operate as a clusterhead/border router, the external routing circuit 230 can be omitted; if a given router is to be preconfigured to operate only as a clusterhead/border router, and never as an attached router, then the attachment circuit 52 can be omitted.

The router 12 includes a network interface circuit 232, logically illustrated as including an egress port 40 configured for establishing an attachment link 32 with an attachment router, one or more peer ports 43 for establishing peer links 30 with peer routers, and multiple ingress ports 42 configured for outputting router advertisement messages and receiving neighbor advertisement messages 16. Each of the ingress ports 42, the egress port 40, as well as the peer port 43, are implemented logically in the network interface circuit 232 at the network layer, such that network (IP) packets may be passed for transmission to at least one link layer interface, for example a interface configured for establishing wireless IEEE 802.11 links. As apparent from the foregoing, however, implementation of the logical peer port 43 may depend on the actual implementation of the wireless network interface device, such that the peer port 43 may actually be assigned to an available "ingress link interface" or an available "egress link interface", or an available "peer link interface" depending on the capabilities of the wireless network interface device.

The router 12 also includes a routing circuit 234. The routing circuit 234 includes a peer discovery circuit 36, a neighbor discovery circuit 44, and an advertisement portion 45 that includes a neighbor advertisement circuit 46 and a router advertisement circuit 50. The router 12 also includes a packet routing circuit 48, an attachment circuit 52, and the routing table 54. The attachment circuit 52 includes a default router list (DRL) 55. The routing circuit to 34 also can include an external routing circuit 230, described below with respect to FIG. 8.

Any of the disclosed circuits of the mobile router 12 (including the network interface circuit 232, the routing circuit 234, and their associated components) can be implemented in multiple forms, including hardware logic that is implemented in a logic array such as a programmable logic array (PLA), a field programmable gate array (FPGA), or by mask programming of integrated circuits such as an application-specific integrated circuit (ASIC); any of these circuits also can be implemented using a software-based executable resource that is executed by a corresponding internal processor such as a microprocessor (not shown), where execution of executable code stored in internal nonvolatile memory (not shown) causes the processor to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor.

Further, any reference to "outputting a message" or "outputting a packet" can be implemented based on to creating the message/packet in the form of a data structure and storing that data structure in a tangible memory medium in the disclosed apparatus (e.g., in a transmit buffer), and electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" can be implemented based on the disclosed apparatus detecting the electrical (or optical) transmission of the message/packet on the communications medium, and storing the detected transmission as a data structure in a tangible memory medium in the disclosed apparatus (e.g., in a receive buffer).

The neighbor advertisement circuit 46, the neighbor discovery circuit 44, and the router advertisement circuit 50 can be implemented for example in accordance with the Request for Comments (RFC) 2461, Neighbor Discovery for IP version 6 (IPv6), published by the IETF. The peer discovery circuit 36 can be implemented for example to perform discovery of peer mobile routers using an I-BGP protocol, OSPF protocol or AODV protocol.

Figure 3:
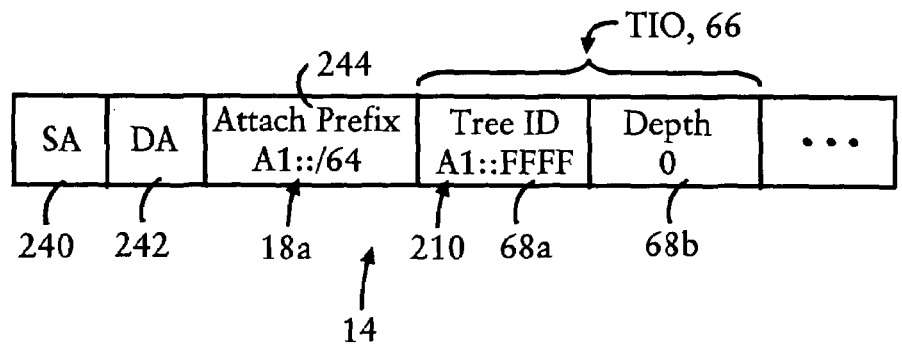
FIG. 3 illustrates an example router advertisement message having a tree information option portion according to an example embodiment.

The router advertisement circuit 50 can be configured for generating and outputting advertisement messages (e.g., the router advertisement message 14 of FIG. 3). As illustrated in FIG. 3, the router advertisement message 14 includes a source address field 240 specifying the IP address of the router 12 outputting the advertisement message 14, a destination address field 242 specifying an any cast address, an attachment prefix field 244 specifying an attachment prefix 18 owned by the attachment router outputting the advertisement message 14, and a tree information option (TIO) field 66. The tree information option field 66 can include a tree identifier field 68a that specifies a tree identifier, and a tree depth 68b. The tree identifier field 68a uniquely identifies the tree (e.g., 10a) by the host IP address (e.g., "A1::FFFF") 210 of the clusterhead. The tree depth field 68b is configured for storing the depth of the router 12 within the tree (i.e., the number of hops to the clusterhead), enabling other routers receiving the advertisement message 14 to determine the relative position of the router advertisement originator within the tree 10 (e.g., 10a or 10b).

The neighbor discovery circuit 44 can be configured for adding tree entries 218 to the routing table 54 based on receiving the respective neighbor advertisement messages 16. Each entry in the routing table 54 (e.g., entries 218, 220c, 220d, 220e, 222 and 228 of FIG. 6B) can be stored as a data structure in a tangible memory (e.g., a dynamic RAM (DRAM) or a non-volatile RAM (NVRAM)) of the router 12. The neighbor discovery circuit 44 also can be configured for determining whether to overwrite an existing tree entry 218 based on receiving another neighbor advertisement message 16 that specifies a sequence number 24 for the corresponding address prefix 18 that is higher than the stored sequence number 24. The neighbor discovery circuit 44 also can be configured for selectively deleting the tree entry 218, for example based on determining that an inactivity timer entry value (not shown) in the routing table entry indicates, when compared with an internal system clock, that a prescribed inactivity interval has elapsed, requiring the inactive tree entry 218 be removed from the table 54.

The attachment circuit 52 includes a default router list 55 (stored in a tangible memory such as a DRAM or NVRAM), enabling the attachment circuit 52 to select an attachment router from a received router advertisement message 14 according to selection criteria as specified by the corresponding tree depth value 68b (e.g., choosing the attachment router having the minimum depth value 68b), to ensure that the attachment router is selected in a manner to ensure the tree topology is maintained. Hence, the attachment circuit 52 is responsible for implementing the protocol requiring establishment of the tree topology in the network, which can be implemented for example as an ad hoc network. Additional details regarding selection of an attachment router to ensure a tree-based topology is described in the above-identified U.S. Patent Application Publication US2004/0032852 A1, published Feb. 19, 2004.

Hence, the attachment circuit 52 in each router 12 independently determines whether to associate with another router advertisement originator having output an RA message 14 based on the tree information option 66 within the RA message 14: the tree information option 66 specifies attributes 68 about the tree to which the router advertisement originator is associated, including tree identifier 68a and tree depth 68b. Once stored as entries in the default router list 55, the attachment circuit 52 can maintain the known trees in an ordered list, per order of preference, and maintain each entry until a corresponding router expiration timer field (not shown) expires.

As apparent from the foregoing, during initial formation of the tree-based topology 10a or 10b, smaller trees can eventually converge into a larger tree connected to a clusterhead capable of operating as a border router, resulting in more stability and connectivity throughout the entire ad hoc network. Nevertheless, the use of neighbor advertisement messages can still used in individual trees during network formation, since the relatively low overhead enables information to be quickly updated with rapid convergence.

The attachment circuit 52 in the mobile router (e.g., 12b) identifies the selected attachment router (e.g., 12a) by choosing a default attachment address (e.g., "A1::A22") 20 within the address space of the advertised prefix (i.e., the attachment prefix) (e.g., "A1::/64"), and adding a default route entry into the routing table 54 that specifies that the attachment prefix (e.g., "A1::/64") is reachable via the default attachment address ("A1::A22") 20.

The router 12 of FIG. 5 also includes a neighbor advertisement circuit 46. As described above with respect to FIG. 4, the neighbor advertisement circuit 46 can be configured for outputting the corresponding neighbor advertisement message 16 specifying the corresponding address prefix (e.g., "A21::/64" 18b) used by the router (e.g., 12c), as well as the address prefixes (e.g., 18c, 18h, 18g, 18k) and the host routes (e.g., 214c) are reachable via the default attachment address 20 (e.g. "A1::A21" 20c), and the host route 214a is reachable via the address "A31::A41" 20k within the subtree. However, the neighbor advertisement message 16 does not include any of the peer routing information stored in the peer table entries 222 within the routing table 54.

The packet routing circuit 48 is configured for routing a received data packet having a specified destination address. If the specified destination address is within the address realms of one of the address prefixes stored in the routing table 54, the packet routing circuit 48 outputs the data packet to the specified attachment address 20. However, if the specified destination is unknown (i.e., no common prefix specified within the routing table 54), the data packet is output using the default attachment address 20 to the attachment router via the egress port 40, based on the assumption that the attachment router will have more routing information. If the mobile router 12 does not have an attachment router and the specified destination is unknown, the packet is dropped.

The peer discovery circuit 36 is configured for operating independent of the advertisement portion 45, and is configured for enabling the mobile router 12 to selectively share its routing information stored in the routing table 54 with other peer routers at the same depth relative to the clusterhead "A1" or "B1". Hence, the peer discovery circuit 36 will supply to other peer routers the entries stored in its routing table 54, indicating to the peer routers that the address prefixes 18, the remote prefixes 226, and the host IP addresses 212 in the routing table 54 are reachable via the mobile router 12.

In addition, the peer discovery circuit 36 is configured for selectively storing peer entries 222 specifying remote address prefixes 226, received from peer routers, into the routing table 54. In particular, the peer discovery circuit 36 in the router (e.g., 12b) is configured for receiving from a peer router (e.g., 12c) the routing information stored by the peer router, including remote address prefixes not within its subtree, the corresponding address (e.g., 224) used by the peer router providing reachability for the remote address prefixes, and a cost attribute 216 identifying the relative cost for reaching the associated remote address prefix 226. The cost attribute 216 can be illustrated as a "depth" attribute that specifies the relative depth to reaching the peer of the other tree topology, although it will be appreciated that other cost attributes may be utilized in accordance with OSPF or AODV protocols. As described below, the peer discovery circuit 36 selectively adds the received peer routing information to the routing table 54 based on determining that the associated costs attributes 216 do not exceed a determined threshold.

Figure 7A:
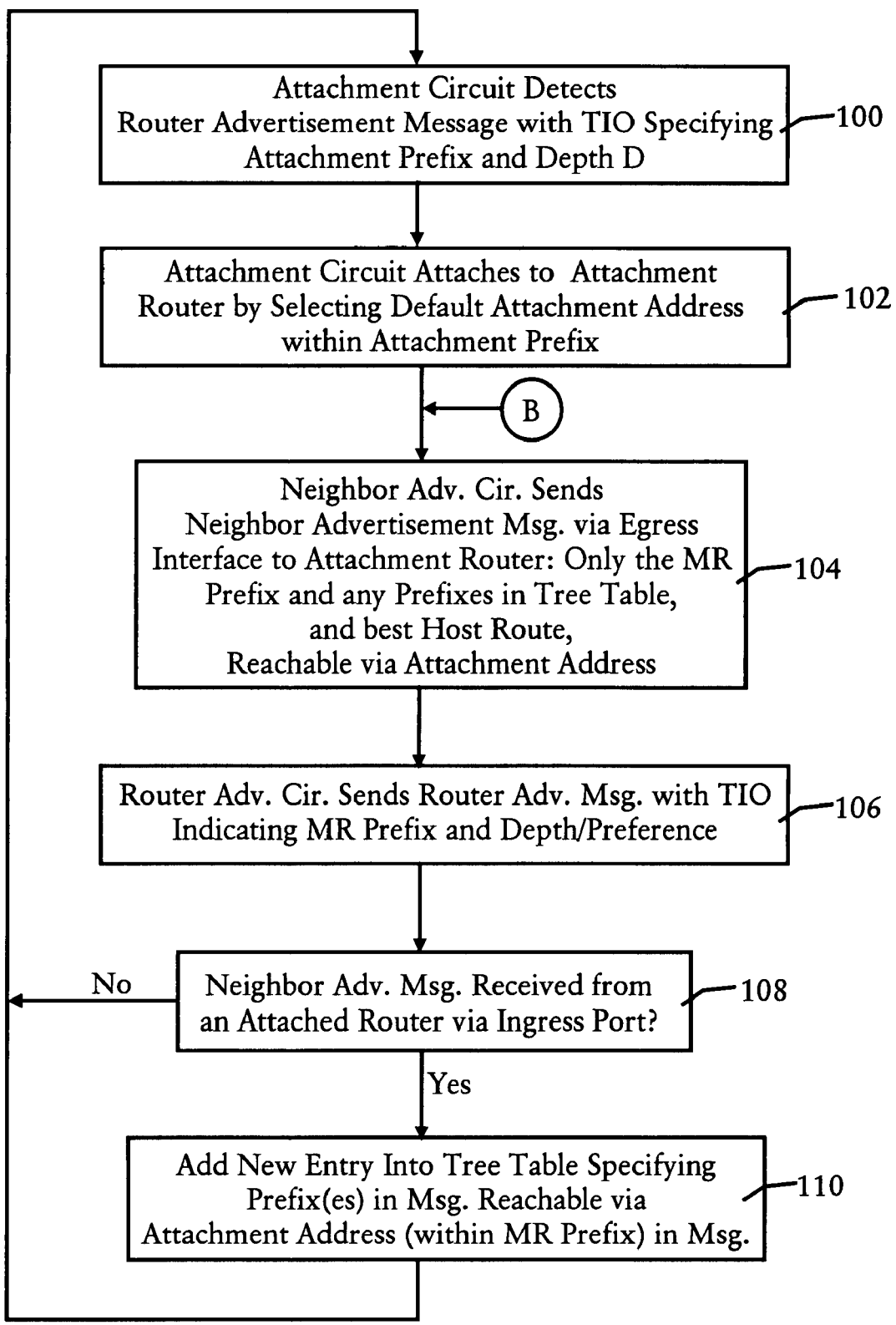
FIGS. 7A and 7B illustrate an example method by the attached routers of FIGS. 1 and 2 according to an example embodiment.
Figure 7B:
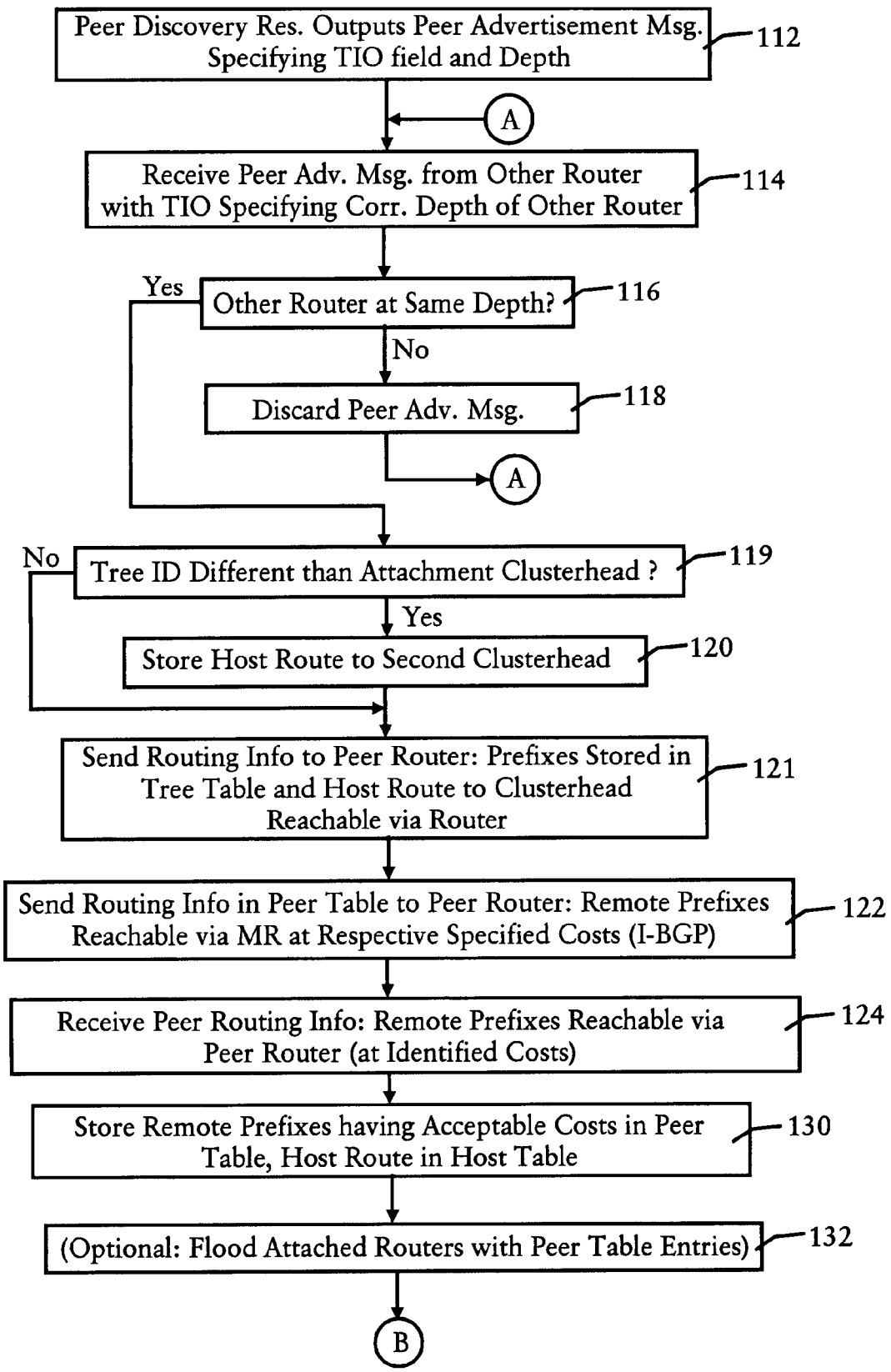

FIGS. 7A and 7B are diagrams methods by attached routers 12, for example as illustrated in FIG. 5, according to an example embodiment. The steps described in FIGS. 7A, 7B, and 8 can be implemented as executable code stored on a computer readable medium (e.g., floppy disk, hard disk, EEPROM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

The method begins in step 100, where the attachment circuit 52 determines whether any new router advertisement messages 14 has been received. If a new router advertisement message 14 has been received, the attachment circuit 52 stores the router advertisement information (e.g., source address of advertising router specified in the source address field 240, attachment prefix 18 specified in the attachment prefix field 244, host IP address 210 of clusterhead specified in tree identifier field 68a, and depth specified in the depth field 68b) in the default router list 55, and attaches in step 102 to an attachment router by selecting a default attachment address 20 within the attachment prefix 18. In particular, the attachment circuit 52 determines whether the tree information option (TIO) for the received router advertisement message 14 indicates a preferred depth closer to the clusterhead 12a, or a higher preference. If a preferred depth or higher preference is detected, the attachment circuit 52 attaches to the attachment router by selecting a default attachment address 20 from within the attachment prefix advertised in the router advertisement message.

The neighbor advertisement circuit 46 in response sends in step 104 the neighbor advertisement message 16 to the attachment router, specifying that the address prefix owned by the router, any prefixes specified in the tree table entries 218, and the best host route for an IPv6 address 212 specified in host route entries 220 stored in the routing table 54, are reachable via the router. As described previously with respect to FIG. 4, the host route 214 can be expressed as reachable either by the default attachment address, or by another reachable address within the subtree. Note, however, that the neighbor advertisement message 16 does not include any peer routing information from the peer entries 222 in the routing table 54.

The router advertisement circuit 50 outputs in step 106 the corresponding router advertisement message 14, specifying the prescribed address prefix 18 used by the mobile router, the tree identifier 68a, and the corresponding depth information 68b, as illustrated in FIG. 3.

The neighbor discovery circuit 44 determines in step 108 whether any neighbor advertisement messages 16 have been received from an attached router via the ingress ports 42. In particular, implementation of the ingress port 42 involves selectively accepting neighbor advertisement messages 16 from the wireless link that are not from the router identified as the attachment router: an neighbor advertisement messages 16 received via the wireless link from the attachment router are discarded.

Assuming a neighbor advertisement message 16 has been received via the ingress interface, the neighbor discovery circuit 44 determines whether the new message 16 specifies a new neighbor prefix 18 that is not present in the routing table 54. If the new message 16 specifies a new neighbor prefix 18, the neighbor discovery circuit 44 adds the new tree entry 218 to the routing table 54 in step 110, and sends an updated neighbor advertisement message 16 in step 104.

Additional details regarding updating the topology of the tree 10 using the neighbor advertisement messages 16, including updating the neighbor advertisement messages 16 in response to detected movement within the tree 10, is described in further detail in the U.S. Patent Publication No. U.S. 2005/0265259 A1, published Jun. 1, 2004.

FIG. 7B describes the method by the peer discovery circuit 36 of identifying peer routers, and sharing routing information with peer mobile routers, according to an example embodiment. The peer discovery circuit 36 outputs in step 112 a peer advertisement message, essentially identical to the router advertisement message 14, that specifies the tree information option field 66 including the tree identifier field 68a and the depth 68b. Assuming in step 114 that the mobile router receives a peer advertisement message from another router having a tree information option 66 specifying a corresponding depth the 68b of the other router, the peer discovery circuit 36 determines in step 116 whether the depth field 68b indicates that the other router having sent the peer advertisement message is at the same depth as the mobile router.

If the peer discovery circuit 36 determines that the other router is not at the same depth, the peer discovery circuit 36 discards the peer advertisement message in step 118. If, however, the other router is at the same depth, and therefore a peer router relative to a clusterhead, the peer discovery circuit 36 determines in step 119 whether the tree identifier 68a specifies a different host identifier: for example, if the router belongs to the tree topology 10a having the tree identifier "A1::FFFF" 210, and the peer discovery circuit 36 determines in step 119 that the IP host address specified in the tree identifier field 68a is "B1::F000" 212, indicating the clusterhead "B1" of the tree topology 10b, the peer discovery circuit 36 stores in step 120 a host route entry 220 specifying that the IP host address specified in the tree identifier field 68a is reachable via the IP address value specified in the corresponding source address field 240.

The peer discovery circuit sends in step 121 the routing information that the attachment prefix and the address prefixes 18 specified in the tree entries 218 of the routing table 54, and the host route of the clusterhead, are reachable via the router (e.g., using the attachment address 20); the routing information also can include a cost, for example a cost of zero relative depth. The peer router, upon receiving the routing information, will store the information in its routing table 54 as peer entries, and increment the cost attributes to indicate reachability via a depth of one. The peer discovery circuit 36 also can send to the peer router, in step 122, the routing information in the peer entries 222 of the routing table 54 and having been received from other peer routers, including that the remote prefixes 226 are reachable via the mobile router's attachment address 20 at the cost specified in the cost attribute field 216. Steps 120 and 122 are illustrated separately to simplify description: it will be appreciated that the peer discovery circuit 36 could simply "flood" the peer router with the entire routing table 54, if desired. Steps 121, 122, and 124 can be performed according to I-BGP protocol.

The peer discovery circuit 36 also will receive in step 124 the peer routing information from the peer router via the peer port 43, according to the prescribed routing protocol (e.g., I-BGP, OSPF, AODV). As described above, the peer port 43 can be implemented by dropping any packets received from the wireless link carrying peer routing information that are sent from any network nodes that is identified either as an attached router or the attachment router. The peer discovery circuit 36 can determine whether any of the remote prefixes specified within the peer routing information exceed a determined cost, for example whether the cost is greater than or equal to twice the depth, indicating the network distance is greater than via the clusterhead. If any cost is greater than the determined threshold, the remote prefix having the unacceptable cost can be discarded, and the remaining remote prefixes having acceptable costs can be stored as new peer entries 222 into the routing table 54 in step 130. In addition, the host route for the remote clusterhead is stored as a host route table entry 220 in the routing table 54 in step 130.

If desired, the peer discovery circuit 36 also can flood the attached routers with the table entries via the ingress interfaces 42. As described earlier, however, the peer routing information is never sent in the neighbor advertisement message 16 that is sent toward the clusterhead. Hence, the peer routing information stored in the routing table 54 is limited to the peer routers and subtrees below the peer routers. As described previously with respect to step 104 of FIG. 7A, an updated neighbor advertisement message is output in step 104 in response to updating the routing table 54.

Figure 8:
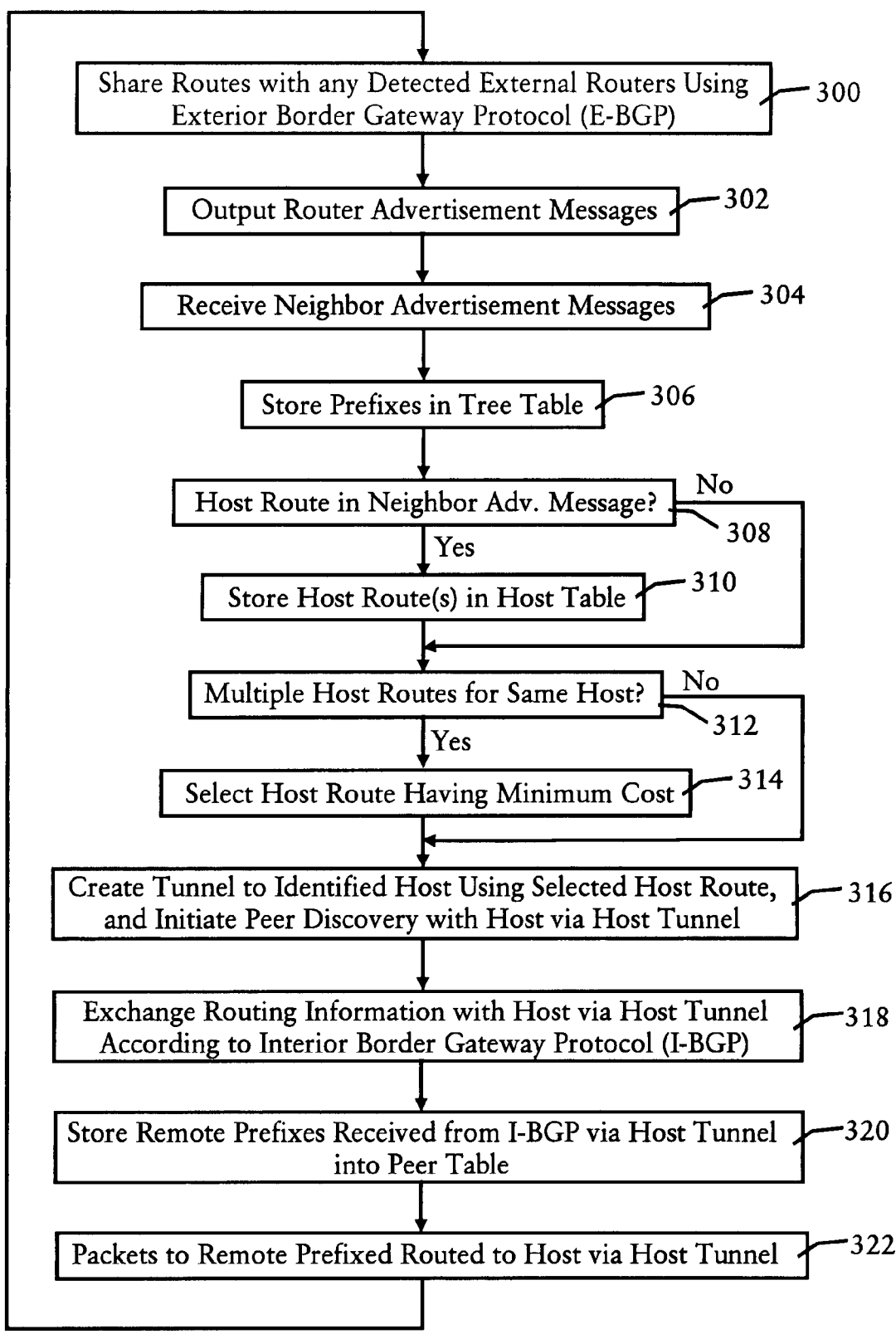
FIG. 8 illustrates an example method by the border routers of FIGS. 1 and 2, according to an example embodiment.

FIG. 8 is a diagram illustrating in further detail a method by a clusterhead "A1" and/or "B1" according to an example embodiment. Assuming that the border router (e.g., "A1") can detect another router 260 from another autonomous system 204, illustrated in FIG. 1, the external routing circuit 230 in the clusterhead (e.g., "A1") shares in step 300 the routes in its routing table 54, illustrated in FIG. 6B, with the external router 260 according to an exterior border gateway protocol (E-BGP). The external routing circuit 230 can share its routes with detected external routers 260 as appropriate, for example in response to updating the routing table 54, or at periodic intervals.

The router advertisement circuit 50 of the clusterhead (e.g., "A1") generates and outputs via its ingress interfaces 42 in step 302 a router advertisement message 14, illustrated in FIG. 3, specifying its attachment prefix (e.g., "A1::/64" 18a) within the attachment prefix field 244, its host IP address (e.g., "A1::FFFF" 210) within the tree identifier field 68a, and a zero depth in the depth field 68b. In response to the ingress interface 42 of the clusterhead receiving neighbor advertisement messages 16 from attached routers in step 304, the neighbor discovery circuit 44 stores in step 306 the advertised prefixes as tree table entries 218 in the routing table 54, illustrated in FIG. 6B.

If in step 308 the neighbor discovery circuit 44 detects any host routes 214 within the received neighbor advertisement message 16, for example as illustrated in FIG. 4, the neighbor discovery circuit 44 stores the host routes 220 in the routing table 54 in step 310, specifying that the IPv6 address to 12 is reachable via a specified path, for example the default attachment address of an attached router, or the default attachment address of an attached router within the same tree topology.

The peer discovery circuit 36 of the clusterhead (e.g., "A1") attempts to communicate with the identified host (e.g., "B1" at "B1::F000") by determining in step 312 whether there are multiple host routes for the same host (e.g., "B1" at "B1::F000"); if there are multiple host routes (e.g., 220c, 220d, and 220e in FIG. 6B), the peer discovery circuit 36 selects in step 314 the host route 220 having the minimum cost (e.g., the host route 220c). The peer discovery circuit 36 creates in step 316 a communication path 202 to the identified host (e.g., "B1" at "B1::F000") using the selected host route 220c as described above, based on generating a unicast peer advertisement message having a destination address field specifying the host IPv6 address "B1::F000" 212, outputting the peer advertisement message via the ingress interface 42 providing an attachment for the next-hop attached router "A21" according to the host route 220c, and initiating peer discovery with the host (e.g., "B1") via the host tunnel 202. The peer discovery circuit 36 exchanges routing information (e.g., the tree table entries 218, peer entries from other routers 228, etc.) in step 318 with the host peer (e.g., "B1" at "B1::F000") via the host tunnel 202 for example according to I-BGP, and stores in step 320 the remote prefixes to 26 in its routing table as peer table entries 222.

Hence, any data packets received by the ingress interface 42 from attached mobile routers can be routed in step 322 to remote prefixes 226 within the autonomous system 200 via the host tunnel 202, and any data packets from attached mobile routers can be routed in step 322 to other remote prefixes 206 can be routed external to the autonomous system 202, based on the exchange routing information in the routing table of FIG. 6B.

According to the example embodiment, routers within an autonomous system can establish a scalable autonomous system 200 for interoperability with other autonomous systems 204 of a wide area network. Hence, mobile routers within a mobile ad hoc network can organize into a tree topology and establish an autonomous system 200 for communications with other autonomous systems 204.

Further, the example routers can establish a proactive routing protocol within the autonomous system with minimal overhead by using neighbor advertisement messages sent toward the clusterhead. The autonomous system 200 can provide a rapid convergence in order to quickly adapt to changes in the tree. Any conflicts encountered in the routing table due to movement of a mobile router within a tree can be resolved in favor of the new tree topology, such that any conflicting peer entry can be discarded. Moreover, rapid convergence can be maintained based on peer routers sharing limited routing information via peer links in a manner that ensures that performance of the trees is not compromised.

What is claimed is:

1. A method comprising:
   attaching by a first router to an attachment router based on detecting a first router advertisement message from the attachment router, the first router advertisement message specifying an attachment prefix owned by the attachment router and a first tree information option, the attachment prefix distinct from a first address prefix owned by the first router, the first tree information option specifying a depth of the attachment router within a first tree topology and a first IP host address, the first IP host address of a first border router of a first autonomous system and serving as a first clusterhead having established the first tree topology in the first autonomous system, the attaching including attaching to the first tree topology based on selecting a default attachment address within the attachment prefix owned by the attachment router, and identifying the depth of the first router relative to the first clusterhead based on the incrementing the depth specified for the attachment router;
   receiving, by the first router, a second advertisement from a second router and specifying a second address prefix and a second tree information option, the second address prefix distinct from the attachment prefix and the first address prefix, the second tree information option specifying a second IP host address, the second IP host address of a second border router of the first autonomous system and serving as a second clusterhead distinct from the first clusterhead and having established a second tree topology in the first autonomous system and distinct from the first tree topology, the second tree information option further specifying the corresponding depth of the second router relative to the second clusterhead; and
   selectively sharing routing information, by the first router, with the second router based on the first router determining that the corresponding depth of the first router relative to the first clusterhead equals the corresponding depth of the second router relative to the second clusterhead, the routing information including specifying that the first address prefix is reachable via the first router, the routing information further including a host route for reaching the first IP host address via the first router, enabling the first border router and the second border router to share routing information for reaching a second autonomous system distinct from the first autonomous system.

2. The method of claim 1, further comprising:
   receiving by the first router second routing information from the second router, the second routing information including third address prefixes distinct from any one of the attachment prefix, the first address prefix, or the second address prefix and reachable by the second router within the second tree topology and a second host route for reaching the second IP host address via the second router; and
   outputting by the first router a neighbor advertisement message to the attachment router, the neighbor advertisement message specifying that the first address prefix is reachable via the default attachment address, and a third host route for reaching the second IP host address via the default attachment address, the neighbor advertisement message not including the third address prefixes.

3. The method of claim 2, further comprising:
   receiving by the first router a second neighbor advertisement from an attached router specifying a second attachment address within the first address prefix, the second neighbor advertisement message specifying a fourth address prefix reachable via the second attachment address, the fourth address prefix distinct from any one of the attachment prefix, the first address prefix, the second address prefix, or the third address prefixes;
   sharing, by the first router, with the second router that the fourth address prefix is reachable via the first router;
   outputting by the first router an updated neighbor advertisement message to the attachment router that specifies that the first address prefix and the fourth address prefix are reachable via the default attachment address, and the third host route that the second IP host address is reachable via the default attachment address within the attachment prefix, the updated neighbor advertisement message not including the third address prefixes.

4. The method of claim 3, wherein:
the second neighbor advertisement specifies a fourth host route for reaching the second IP host address via the second attachment address at a corresponding identified cost,
the third host route in the updated neighbor advertisement message specifying a corresponding cost, and
the updated neighbor advertisement including a third host route for reaching the second IP host address via the second attachment address as a best host route relative to the fourth host route.

5. The method of claim 3, further comprising flooding, by the first router, the attached router specifying that the routing information and the second routing information are reachable via the first router.

6. The method of claim 1, wherein the selectively sharing includes sharing the routing information between the first router and the second router according to an interior border gateway routing protocol, the first and second routers establishing a distinct area within the first autonomous system having been established by the first border router and the second border router.

7. A method comprising:
detecting, by a border router of a first autonomous system, an external router of a second autonomous system distinct from the first autonomous system, and in response sharing routes with the external router according to an exterior border gateway protocol;
outputting, by the border router, a router advertisement message specifying an attachment prefix and a tree information option, the attachment prefix owned by the border router and the tree information option identifying the border router as a first clusterhead of a first tree topology in the first autonomous system based on the tree information option having a depth field specifying a zero depth and a tree identifier field specifying a first IP host address of the border router;
receiving, by the border router, neighbor advertisement messages from attached routers within the first autonomous system and having attached to the border router using respective attachment addresses within an address realm of the attachment prefix, each neighbor advertisement message specifying reachability via the corresponding attachment address of at least one address prefix that is distinct from the attachment prefix and distinct from other address prefixes specified in the neighbor advertisement messages from any other attached router;
detecting, by the border router in at least one of the neighbor advertisement messages, at least a first host route for reaching a second IP host address of a second border router of the first autonomous system via a corresponding at least one of the attachment addresses, the second IP host address not within the address realm of the attachment prefix or any of the address prefixes specified in the neighbor advertisement messages;
storing, by the border router in a routing table in the border router, the address prefixes reachable via the attachment addresses and the first host route based on the received neighbor advertisement messages;
creating a communication path with the second border router at the second IP host address based on the first host route; and
exchanging routing information by the border router with the second border router via the communication path according to an interior border gateway protocol, the routing information specifying that the second autonomous system, the address prefixes specified in the neighbor advertisement messages, and the attachment prefix owned by the border router are reachable via the first IP host address of the border router, the communication path and the exchanging routing information enabling the border router and the second border router to form a backbone area of the first autonomous system.

8. The method of claim 7, wherein the exchanging routing information includes receiving remote reachability information specifying remote prefixes that are reachable via the second IP host addresses, wherein none of the remote prefixes are within the address realm of the attachment prefix or any of the address prefixes specified in the neighbor advertisement messages.

9. The method of claim 7, wherein:
the first host route specifies a corresponding first cost for reaching the second IP host address;
at least another one of the neighbor advertisement messages specifying a second host route for reaching the second IP host address via the corresponding attachment address at a corresponding second cost;
the creating including selecting the first host route for reaching the second IP host address based on the corresponding first cost being less than the second cost.

10. The method of claim 9, wherein the creating further includes storing the first host route and the second host route concurrently in the routing table.

11. The method of claim 7, further comprising:
receiving a data packet from one of the attached routers, the data packet specifying a destination address;
determining from the routing table that the destination address is reachable via the second IP host address; and
forwarding the data packet to the second border router via the communication path.

12. An apparatus comprising:
a network interface circuit configured for receiving:
a first router advertisement message from an attachment router, the first router advertisement message specifying an attachment prefix owned by the attachment router and a first tree information option, the attachment prefix distinct from a first address prefix owned by the apparatus, the first tree information option specifying a depth of the attachment router within a first tree topology and a first IP host address, the first IP host address of a first border router of a first autonomous system and serving as a first clusterhead having established the first tree topology in the first autonomous system, and
a second advertisement from a second router and specifying a second address prefix and a second tree information option, the second address prefix distinct from the attachment prefix and the first address prefix, the second tree information option specifying a second IP host address, the second IP host address of a second border router of the first autonomous system and serving as a second clusterhead distinct from the first clusterhead and having established a second tree topology in the first autonomous system and distinct from the first tree topology, the second tree information option further specifying the corresponding depth of the second router relative to the second clusterhead; and
a routing circuit configured for attaching to the first tree topology based on selecting a default attachment address within the attachment prefix owned by the attachment router, and identifying the depth of the apparatus relative to the first clusterhead based on the incrementing the depth specified for the attachment router, the routing circuit further configured for selectively sharing routing information with the second router based on determining that the corresponding depth of the apparatus relative to the first clusterhead equals the corresponding depth of the second router relative to the second clusterhead, the routing information including specifying that the first address prefix is reachable via the apparatus, the routing information further including a host route for reaching the first IP host address via the apparatus, enabling the first border router and the second border router to share routing information for reaching a second autonomous system distinct from the first autonomous system.

13. The apparatus of claim 12, wherein:
the network interface circuit is configured for receiving second routing information from the second router, the second routing information including third address prefixes distinct from any one of the attachment prefix, the first address prefix, or the second address prefix and reachable by the second router within the second tree topology and a second host route for reaching the second IP host address via the second router;
the routing circuit is configured for generating, for output to the attachment router, a neighbor advertisement message specifying that the first address prefix is reachable via the default attachment address, and further specifying a third host route for reaching the second IP host address via the default attachment address, the neighbor advertisement message not including the third address prefixes.

14. The apparatus of claim 13, wherein:
the network interface circuit is configured for receiving a second neighbor advertisement from an attached router specifying a second attachment address within the first address prefix, the second neighbor advertisement message specifying a fourth address prefix reachable via the second attachment address, the fourth address prefix distinct from any one of the attachment prefix, the first address prefix, the second address prefix, or the third address prefixes;
the routing circuit configured for sharing with the second router that the fourth address prefix is reachable via the first router;
the routing circuit further configured for generating, for output to the attachment router, an updated neighbor advertisement message that specifies that the first address prefix and the fourth address prefix are reachable via the default attachment address, and further specifying the third host route that the second IP host address is reachable via the default attachment address within the attachment prefix, the updated neighbor advertisement message not including the third address prefixes.

15. The apparatus of claim 14, wherein:
the second neighbor advertisement specifies a fourth host route for reaching the second IP host address via the second attachment address at a corresponding identified cost,
the routing circuit further configured for specifying for the third host route in the updated neighbor advertisement message a corresponding cost, and
the routing circuit further configured for selecting the third host route for the updated neighbor advertisement message, based on determining the third host route has a best cost for reaching the second IP host address relative to the fourth host route.

16. The apparatus of claim 14, wherein the routing circuit is configured for flooding the attached router with the routing information and the second routing information that are reachable via the first router.

17. The apparatus of claim 12, wherein the routing circuit is configured for sharing the routing information with the second router according to an interior border gateway routing protocol, the apparatus and the second router establishing a distinct area within the first autonomous system having been established by the first border router and the second border router.

18. An apparatus comprising:
a routing table, the apparatus implemented as a border router of a first autonomous system;
a routing circuit configured for sharing routes with an external router of a second autonomous system, distinct from the first autonomous system, according to an exterior border gateway protocol in response to detection of the external router, the routing circuit further configured for generating a router advertisement message specifying an attachment prefix and a tree information option, the attachment prefix owned by the apparatus and the tree information option identifying the apparatus as a first clusterhead router of a first tree topology in the first autonomous system based on the tree information option having a depth field specifying a zero depth and a tree identifier field specifying a first IP host address of the apparatus; and
a network interface circuit configured for outputting the router advertisement message on at least one network link in the first autonomous system, the network interface circuit configured for receiving, via the at least one network link, neighbor advertisement messages from attached routers having attached to the first clusterhead router using respective attachment addresses within an address realm of the attachment prefix, each neighbor advertisement message specifying reachability via the corresponding attachment address of at least one address prefix that is distinct from the attachment prefix and distinct from other address prefixes specified in the neighbor advertisement messages from any other attached router;
the routing circuit further configured for detecting, in at least one of the neighbor advertisement messages, at least a first host route for reaching a second IP host address of a second border router of the first autonomous system via a corresponding at least one of the attachment addresses, the second IP host address not within the address realm of the attachment prefix or any of the address prefixes specified in the neighbor advertisement messages;
the routing circuit further configured for storing, in the routing table, the address prefixes reachable via the attachment addresses and the first host route based on the received neighbor advertisement messages;
the routing circuit further configured for creating a communication path with the second border router at the second IP host address based on the first host route, and exchanging routing information with the second router via the communication path according to an interior gateway protocol, the routing information specifying that the second autonomous system, the address prefixes specified in the neighbor advertisement messages, and the attachment prefix owned by the apparatus are reachable via the first IP host address of the apparatus, the communication path and the exchanging routing information enabling the apparatus and the second border router to form a backbone area of the first autonomous system.

19. The apparatus of claim 18, wherein the routing received from the second router via the communication path includes remote reachability information specifying remote prefixes that are reachable via the second IP host addresses, wherein none of the remote prefixes are within the address realm of the attachment prefix or any of the address prefixes specified in the neighbor advertisement messages.

20. The apparatus of claim 18, wherein:
the first host route specifies a corresponding first cost for reaching the second IP host address;
at least another one of the neighbor advertisement messages specifying a second host route for reaching the second IP host address via the corresponding attachment address at a corresponding second cost;
the routing circuit is configured for selecting the first host route for reaching the second IP host address based on determining that the corresponding first cost being less than the second cost.

21. The apparatus of claim 20, wherein the routing circuit is configured for storing the first host route and the second host route concurrently in the routing table.

22. The apparatus of claim 18, wherein:
the network interface circuit is configured for receiving a data packet from one of the attached routers, the data packet specifying a destination address;
the routing circuit is configured for determining from the routing table that the destination address is reachable via the second IP host address, and in response encapsulating the data packet in an encapsulated packet;
the network interface circuit configured for forwarding the encapsulated packet containing the data packet to the second border router via the communication path.

23. An apparatus comprising:
means for receiving a first router advertisement message from an attachment router, and a second advertisement from a second router, the first router advertisement message specifying an attachment prefix owned by the attachment router and a first tree information option, the attachment prefix distinct from a first address prefix owned by the apparatus, the first tree information option specifying a depth of the attachment router within a first tree topology and a first IP host address of a first border router of a first autonomous system and serving as a first clusterhead having established the first tree topology in the first autonomous system, the second advertisement specifying a second address prefix and a second tree information option, the second address prefix distinct from the attachment prefix and the first address prefix, the second tree information option specifying a second IP host address of a second border router of the first autonomous system and serving as a second clusterhead distinct from the first clusterhead and having established a second tree topology in the first autonomous system and distinct from the first tree topology, the second tree information option further specifying the corresponding depth of the second router relative to the second clusterhead; and
means for attaching to the first tree topology based on selecting a default attachment address within the attachment prefix owned by the attachment router, and identifying the depth of the apparatus relative to the first clusterhead based on the incrementing the depth specified for the attachment router, the means for attaching further configured for selectively sharing routing information with the second router based on determining that the corresponding depth of the apparatus relative to the first clusterhead equals the corresponding depth of the second router relative to the second clusterhead, the routing information including specifying that the first address prefix is reachable via the apparatus, the routing information further including a host route for reaching the first IP host address via the apparatus, enabling the first border router and the second border router to share routing information for reaching a second autonomous system distinct from the first autonomous system.

24. An apparatus comprising:
means for storing routing information, the apparatus implemented as a border router of a first autonomous system
means for generating a router advertisement message, the means for generating further configured for generating routes with an external router of a second autonomous system, distinct from the first autonomous system, according to an exterior border gateway protocol in response to detection of the external router, the router advertisement message specifying an attachment prefix and a tree information option, the attachment prefix owned by the apparatus and the tree information option identifying the apparatus as a first clusterhead router of a first tree topology in the first autonomous system based on the tree information option having a depth field specifying a zero depth and a tree identifier field specifying a first IP host address of the apparatus;
means for outputting the router advertisement message on at least one network link in the first autonomous system, the means for outputting further configured for receiving, via the at least one network link, neighbor advertisement messages from attached routers having attached to the first clusterhead router using respective attachment addresses within an address realm of the attachment prefix, each neighbor advertisement message specifying reachability via the corresponding attachment address of at least one address prefix that is distinct from the attachment prefix and distinct from other address prefixes specified in the neighbor advertisement messages from any other attached router;
the means for generating further configured for detecting, in at least one of the neighbor advertisement messages, at least a first host route for reaching a second IP host address of a second border router of the first autonomous system via a corresponding at least one of the attachment addresses, the second IP host address not within the address realm of the attachment prefix or any of the address prefixes specified in the neighbor advertisement messages;
the means for generating further configured for storing, into the means for storing, the address prefixes reachable via the attachment addresses and the first host route based on the received neighbor advertisement messages;
the means for generating further configured for creating a communication path with the second router at the second IP host address based on the first host route, and exchanging routing information with the second router via the communication path according to an interior gateway protocol, the routing information specifying that the second autonomous system, the address prefixes specified in the neighbor advertisement messages, and the attachment prefix owned by the apparatus are reachable via the first IP host address of the apparatus, the communication path and the exchanging routing information enabling the apparatus and the second border router to form a backbone area of the first autonomous system.

* * * * *